United States Patent [19]
Koskinen

[11] Patent Number: 6,062,862
[45] Date of Patent: May 16, 2000

[54] FINANCIAL SERVICES PRODUCT TRAINING APPARATUS AND METHOD RELATED THERETO

[76] Inventor: Robin S. Koskinen, 1443 N. Dearborn, Chicago, Ill. 60610

[21] Appl. No.: 08/968,931

[22] Filed: Nov. 12, 1997

Related U.S. Application Data
[60] Provisional application No. 60/030,442, Nov. 13, 1996.

[51] Int. Cl.[7] .......................... G09B 19/18; G09B 19/00; G06F 17/60
[52] U.S. Cl. .......................... 434/107; 434/118; 434/219; 705/35
[58] Field of Search .................... 434/107, 118, 434/219, 236; 705/1, 7, 10, 11, 35, 36, 37

[56] References Cited

U.S. PATENT DOCUMENTS

| | | | |
|---|---|---|---|
| 4,595,982 | 6/1986 | Burt | 364/300 |
| 4,648,037 | 3/1987 | Valentino | 705/36 |
| 4,772,206 | 9/1988 | Kerr et al. | 434/118 |
| 4,847,784 | 7/1989 | Clancey | 364/513 |
| 5,103,498 | 4/1992 | Lanier et al. | 395/68 |
| 5,306,154 | 4/1994 | Ujita et al. | 434/218 |
| 5,339,392 | 8/1994 | Risberg et al. | 395/161 |
| 5,372,507 | 12/1994 | Goleh | 434/118 |
| 5,395,243 | 3/1995 | Lubin et al. | 434/118 |
| 5,421,730 | 6/1995 | Lasker, III et al. | 434/118 |
| 5,442,759 | 8/1995 | Chiang et al. | 705/1 |
| 5,454,104 | 9/1995 | Steidlmayer et al. | 395/600 |
| 5,489,213 | 2/1996 | Makipaa | 434/322 |
| 5,502,637 | 3/1996 | Beaulieu et al. | 364/408 |
| 5,535,422 | 7/1996 | Chiang et al. | 395/155 |
| 5,540,589 | 7/1996 | Waters | 434/156 |
| 5,597,312 | 1/1997 | Bloom et al. | 434/362 |
| 5,692,233 | 11/1997 | Garman | 705/36 |
| 5,904,485 | 5/1999 | Siefert | 434/322 |

*Primary Examiner*—Robert A. Hafer
*Assistant Examiner*—John Edmund Rovnak
*Attorney, Agent, or Firm*—Michael Best & Friedrich

[57] ABSTRACT

The invention includes a user method and system for accessing mentor experience information in a knowledge based user educational guidance system accessing, storing, compiling and transferring mentor experience information directed to financial services. The method includes the steps of providing a graphical user interface for introducing and navigating throughout the knowledge based system, providing a set of alternative learning paths which require interactive user participation in accordance with the mentor experience information, providing means for the user to interactively select a desired learning path based on user interest and demonstrated performance, providing contextual case based explication and application of the mentor knowledge and experience directed to financial services, providing a set of interactive multi-tiered valid use simulations of application of the knowledge in accordance with the knowledge based system, providing interactive means for mentoring the user when, as, and if user learning guidance is required, and providing consequential feedback for the user based on user responses to the mentoring.

13 Claims, 34 Drawing Sheets

Table of Contents

View by Episode

View by Topic

View by Institution

View by Photo

LIST OF TOPICS

Asset Allocation
Asset Management
Asymmetric Hedging
Balance Sheet Considerations
Basis Risk
Bermuda Swap
Board of Directors Responsibilities
Capital Adequacy
Capital, Cost of
Caps, Interest Rates
Clearing House, Swaps
Collars, Interest Rates
Collateralization Click on the scroll bar on the right to view the list of topics that will be covered in the final version of this course.

| Main | Episode | Calculator | Conference Rooms | Glossary | Exit |

Table of Contents

| View by Episode | | INSTITUTION |
|---|---|---|
| | | 1st Bank of America<br>--Treasurer, Susan Matthews |
| View by Topic | | Monolithic Insurance Company<br>--Chief Investment Officer, Edward Morton |
| | | Banque de Versailles<br>--Manager, Dollar Investments, Philippe Courton |
| View by Institution | | Golden County, California<br>--Treasurer, Jeffrey Davidson |
| | | Pacific Coast Federal Savings and Load<br>--Treasurer, Mercedes Sanchez |
| View by Photo | | |

Click on the top section to immediately launch you to the beginning of Episode 1.

| Main | Episode | Calculator | Conference Rooms | Glossary | Exit |

Controlling Derivatives

This section of the map deals with the roles of accounting, credit, systems, operations, policies and procedures, and the regulators in controlling a firm's derivatives exposure.

| Main Menu | Back to Map | More Detail |

Time Value of Money

If I invest $1,000 and earn an annual rate of 10%, at the end of that year I will have $100 of interest income, and the total value of my investment will be $1,100. Right?

Well, perhaps. It depends on what assumptions are made about compounding and day count.

Graphic Image

*Click to Continue*

Back

| Main | Episode | Calculator | Conference Rooms | Glossary | Exit |

Time Value of Money

Let's take a closer look at compounding.

The first formula implied in this idea goes something like this:

Principal X Annual Rate = Interest Income

Let's enter some numbers for our example.

Enter a Principal Amount:   50,000.00      Hit the
(i.e. 1,000, 2,000,000)                     return or tab
                                            keys to
Enter an Annual Rate:       0.06            enter the
(i.e. .10, .065)                            numbers.

Our equation now looks like this:
$50,000 X .06 = $3,000

*Click to Continue*

Back

| Main | Episode | Calculator | Conference Rooms | Glossary | Exit |

Time Value of Money

If we want to calculate the cumulative value of Principal + Interest, we multiply...

Principal X Annual Rate = Interest Income $50,000 X .06 = $3,000

Principal X (1 + Annual Rate) = Principal + Interest Income = TOTAL VALUE

Using the numbers you've entered, we get

$50,000 X (1 + .06) = $50,000 + $3,000 = $53,000

*Click to Continue*

Back

| Main | Episode | Calculator | Conference Rooms | Glossary | Exit |

3-E'

Time Value of Money

But what happens if we have semi-annual compounding?

In this case, we know that since we will receive interest twice a year, the amount received each time will be half of the annual total. So at the first coupon payment, we will have...

$$\text{Principal} \times \frac{\text{Annual Rate}}{\text{\# of Pmts per Year}} = \text{1st Period Interest Income}$$

$$\$50{,}000 \times (.06 / 2) = \$1{,}500$$

Principal X (1 + Annual Rate) = Principal + Interest Income = TOTAL VALUE

*Click to Continue*

Back

| Main | Episode | Calculator | Conference Rooms | Glossary | Exit |

FIG. 17

Time Value of Money
Practice:
Ellen has invested $1,000,000 at an annual rate of 8.00% interest. Assuming semi-annual compounding, what is the value of her first interest payment?
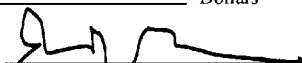
Continue
(Click on the check that is written for the correct amount.)
3-G'
FIG. 18

Time Value of Money
Practice:
Ellen has invested $1,000,000 at an annual rate of 8.00% interest. Assuming semi-annual compounding, what is the value of her first interest payment?
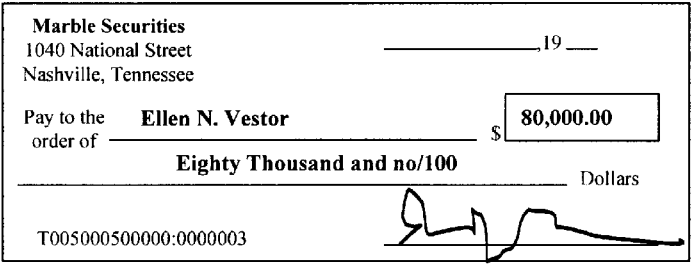
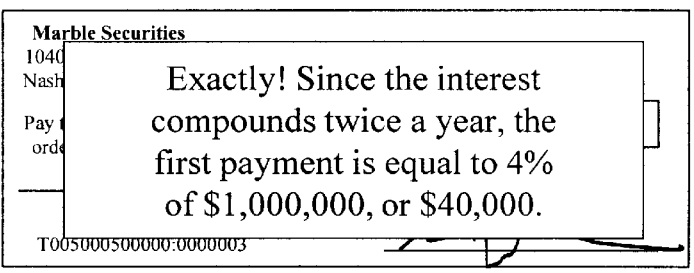
Exactly! Since the interest compounds twice a year, the first payment is equal to 4% of $1,000,000, or $40,000.
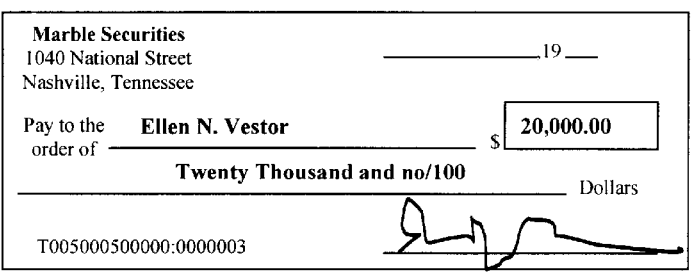
Continue
(Click on the check that is written for the correct amount.)
3H'
FIG. 19

Time Value of Money

The total value of our investment will be:

$$\text{Principal} \times \frac{\text{Annual Rate}}{\text{\# of Pmts per Year}} = \text{1st Period Interest Income}$$

$$\text{Principal} \times \left[ 1 + \frac{\text{Annual Rate}}{\text{\# of Pmts per Year}} \right] = \text{TOTAL VALUE After 1st Interest Payment}$$

$$\$50{,}000 \times [\, 1 + (.06 / 2)\,] = \$50{,}000 + \$1{,}500 = \$51{,}500$$

*Click to Continue*

Back

| Main | Episode | Calculator | Conference Rooms | Glossary | Exit |

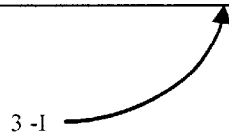

Time Value of Money

The second payment now has to include interest not only on the original principal, but on the total value after the first payment, including the interest earned in the first period. So, the formula for the second period will be:

$$\text{Principal} \times \left[1 + \frac{\text{Annual Rate}}{\text{\# of Pmts per Year}}\right] = \begin{array}{c}\text{TOTAL VALUE}\\ \text{After 1st}\\ \text{Interest Payment}\end{array}$$

$$\begin{array}{c}\text{TOTAL VALUE}\\ \text{After 1st}\\ \text{Interest Payment}\end{array} \times \left[1 + \frac{\text{Annual Rate}}{\text{\# of Pmts per Year}}\right] = \begin{array}{c}\text{TOTAL VALUE}\\ \text{After 2nd}\\ \text{Interest Payment}\end{array}$$

Or, in our example, $$\$51{,}500 \times [1 + (.06/2)] = \$51{,}500 + \$1{,}545 = \$53{,}045$$

*Click to Continue*

Back

| Main | Episode | Calculator | Conference Rooms | Glossary | Exit |

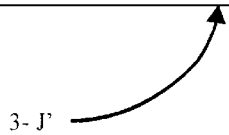

3-J'

Calculators
This calculator performs simple arithmetic functions (addition, subtraction, multiplication and division). In addition to percentage and exponential functions. Press "C" to start over, "CE" to delete a character. You may use either the mouse or keyboard.
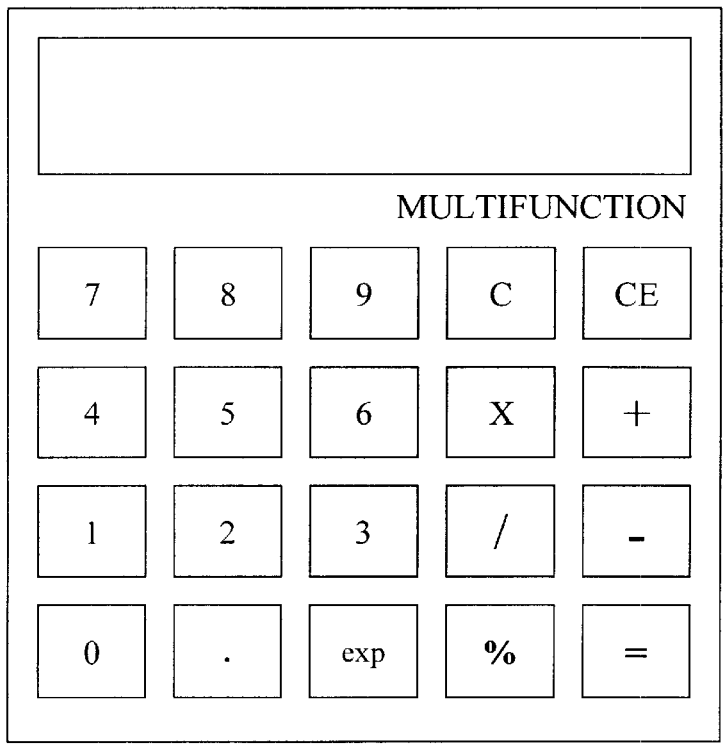
MULTIFUNCTION
| 7 | 8 | 9 | C | CE |
| 4 | 5 | 6 | X | + |
| 1 | 2 | 3 | / | - |
| 0 | . | exp | % | = |
Back
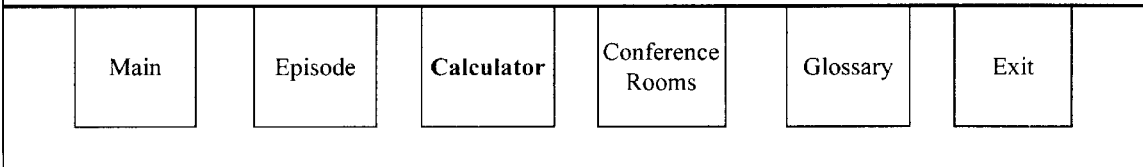
| Main | Episode | Calculator | Conference Rooms | Glossary | Exit |
4A"
FIG. 23

Glossary
Find a definition for
the meaning of a
particular word
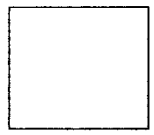 Word Search
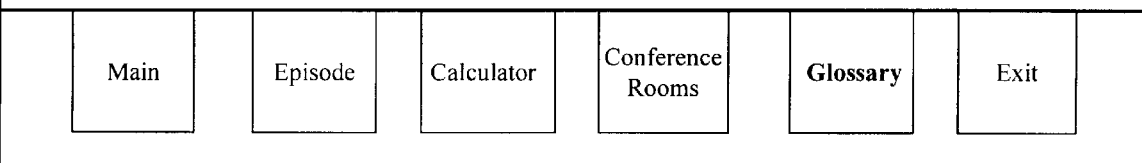
6'
FIG. 28

FLOW CHART OF ACTIVITIES

FLOW CHART OF ACTIVITIES

FINANCIAL SERVICES PRODUCT TRAINING APPARATUS AND METHOD RELATED THERETO

PRIORITY CLAIM

This application claims the benefit of priority of earlier filed provisional patent application Ser. No. 60/030,442, filed Nov. 13, 1996, by Robin Koskinen, entitled "FINANCIAL SERVICES PRODUCT TRAINING APPARATUS AND METHOD RELATED THERETO."

BACKGROUND OF THE INVENTION

This invention generally relates to a financial services product training apparatus and methods related thereto; and, more particularly relates to a financial derivative product training apparatus and method related thereto.

Currently, people skilled in this field of technology are using on the job training and conventional human instructor based classes to train individuals in the area of complex financial transactions. The methods and devices in the art have a variety of drawbacks which include problems related to understanding the opportunities and risks of derivative products and investments. An understanding of these opportunities and risks requires not only a knowledge of how they work, but also an understanding of how to manage them effectively. There exists a need to utilize the advantages of derivative products and investments and to avoid the pitfalls encountered by Orange County, Proctor and Gamble, Baring Securities, et al. Concurrently, users need to reeducate existing personnel who are involved with commoditized products like U.S. Government offered products.

Unlike traditional classroom training, understanding can be delivered at the convenience of the learner, rather than of the instructor utilizing the invention. The invention affords the learner far more opportunity for hands-on experience than is possible in a classroom or from a video. Importantly, it is not developed by academics or personnel from the traditional training milieu, and it is much more than rote drill exercises, such as SAT study guides, or just a "book-on-a-CD." Profitable strategies that utilize complex new concepts and ideas are learned more reliably, faster, and cheaper than through existing practices. Knowledge is presented in a consistent and repeatable way, ensuring common understandings, both horizontally across corporate branch networks, and vertically from management to the back office.

This invention targets financial services organizations, with emphasis on securities and commodities broker/dealers and their customers as well as accounting and control personnel. This is a cash flow-rich customer base with a well documented need to increase revenues and to reduce overhead, and it is an object of this invention to meet the needs of this marketplace and to solve the problems in the art.

SUMMARY OF THE INVENTION

The invention includes a user method and system for accessing mentor experience information in a knowledge based user educational guidance system accessing, storing, compiling and transferring mentor experience information directed to financial services. The method includes the steps of providing a graphical user interface for introducing and navigating throughout the knowledge based system, providing a set of alternative learning paths which require interactive user participation in accordance with the mentor experience information, providing means for the user to interactively select a desired learning path based on user interest and demonstrated performance, providing contextual case based explication and application of the mentor knowledge and experience directed to financial services, providing a set of interactive multi-tiered valid use simulations of application of the knowledge in accordance with the knowledge based system, providing interactive means for mentoring the user when, as, and if user learning guidance is required, and providing consequential feedback for the user based on user responses to the mentoring.

The objects and features of the present invention, other than those specifically set forth above, will become apparent in the detailed description of the invention and drawings set forth below.

BRIEF DESCRIPTION OF THE DRAWINGS

FIG. 7 illustrates a screen accessed by designating the view by topic user option of FIG. 5;

FIG. 8 illustrates a screen accessed by designating the view by institution user option of FIG. 5;

FIG. 10 illustrates a controlling derivatives screen accessed by designating the controlling derivatives user option of FIG. 9;

FIGS. 13–21 illustrate exemplary user experience level screens on the topic of the time value of money;

FIG. 23 illustrates a supplemental calculator screen accessed by designating the standard multi-function user option of FIG. 22;

FIG. 28 illustrates a glossary screen accessed by designating the glossary user option of FIG. 1;

DETAILED DESCRIPTION OF THE INVENTION

The present invention includes a suite of inter-related multimedia routines, files screens, and user options that provide hands-on experience in complex financial instruments by means of the simulation of a mentor/protege relationship. Through a series of case-based scenarios, a user has the opportunity to recreate six months of actual on-the-job-training. Because of this contextuality, the product does more than just explain how derivatives work; it demonstrates the development of a value-added, consultative client relationship. The concept is one of selling solutions, not products. Since the materials are developed by experienced practitioners rather than academics, they are both realistic and current. All activities are self-paced, highly interactive, contextual, engaging and fun. They afford the opportunity to learn from mistakes without jeopardizing client relationships or the bottom line. Since they are delivered on CD/ROM (not shown), over the internet, or over an intranet, they can be used in private. This eliminates one of the greatest barriers to learning: the need to publicly admit to a lack of knowledge.

The invention includes a user method for accessing mentor experience information in a knowledge based user educational guidance system accessing, storing, compiling and transferring mentor experience information directed to financial services. The method includes the steps of providing a graphical user interface for introducing and navigating throughout the knowledge based system, providing a set of alternative learning paths which require interactive user participation in accordance with the mentor experience information, providing means for the user to interactively select a desired learning path based on user interest and demonstrated performance, providing contextual case based explication and application of the mentor knowledge and experience directed to financial services, providing a set of interactive multi-tiered valid use simulations of application of the knowledge in accordance with the knowledge based system, providing interactive means for mentoring the user when, as, and if user learning guidance is required, and providing consequential feedback for the user based on user responses to the mentoring. Exemplary financial services include derivative related services, securities services, and commodities services. Training related to other financial services is also provided for herein.

Figure 1:
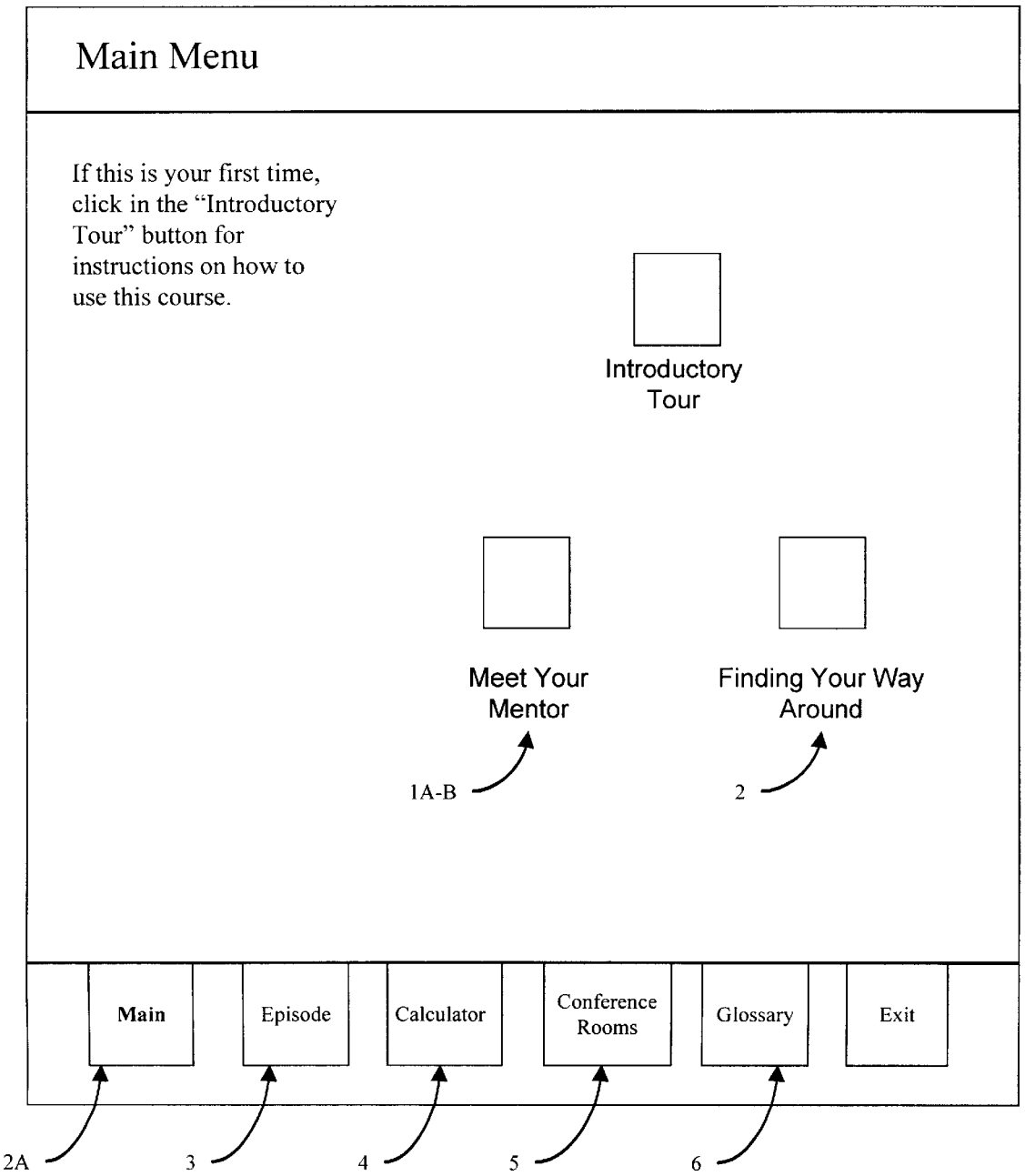
FIG. 1 illustrates a graphical user interface of the present invention showing various user options including a go to intro user option, an episodes user option, a calculator user option, a conference room user option, and a glossary user option.
Figure 33:
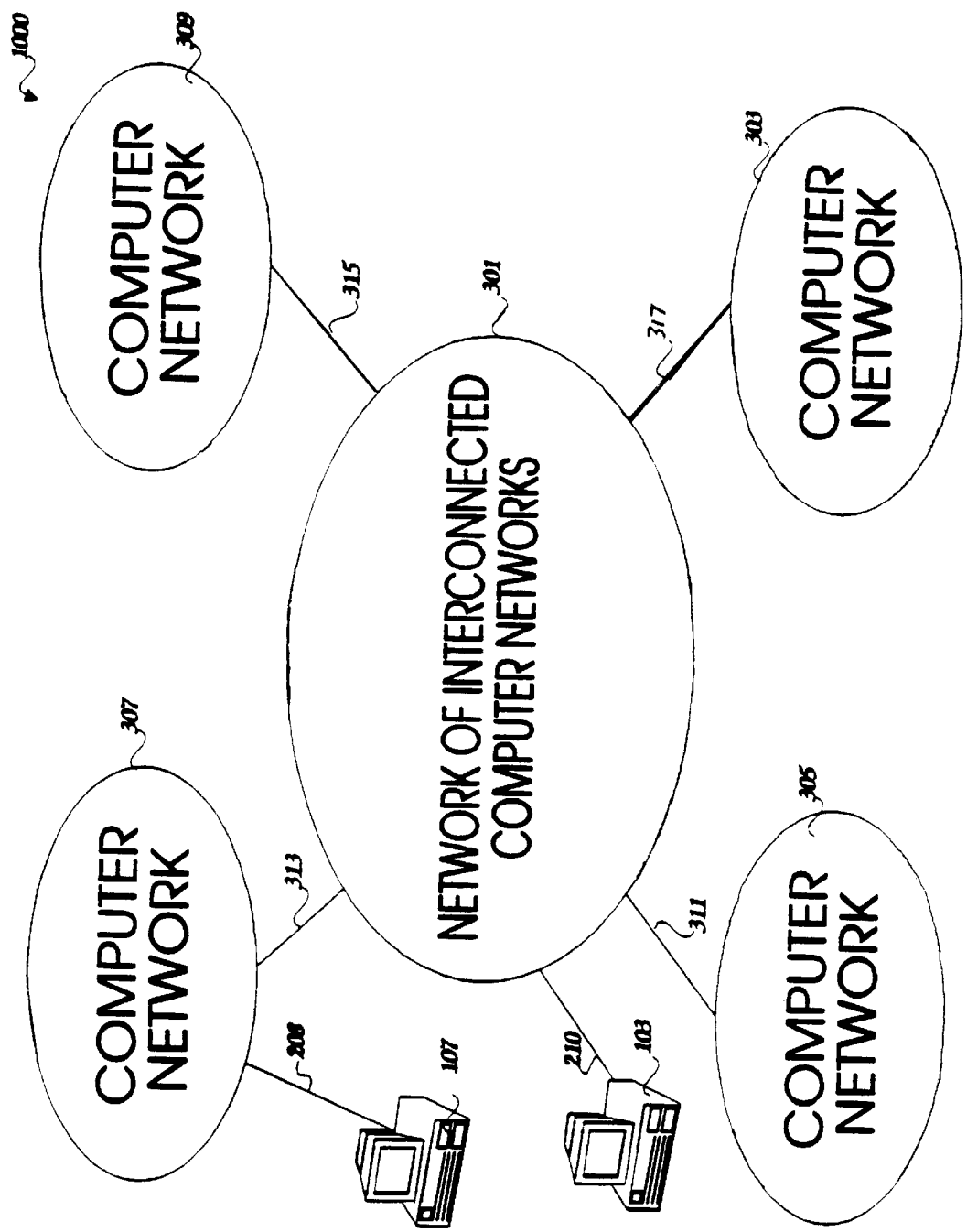
FIG. 33 illustrates a diagram of a server of the present invention communicatively linked to a network of interconnected computers including a multiplicity of users' personal computers or workstations; and, FIG. 34 illustrates a diagram of a server of the present invention communicatively linked to an intranet having a plurality of users' personal computers or workstations thereon.
Figure 34:
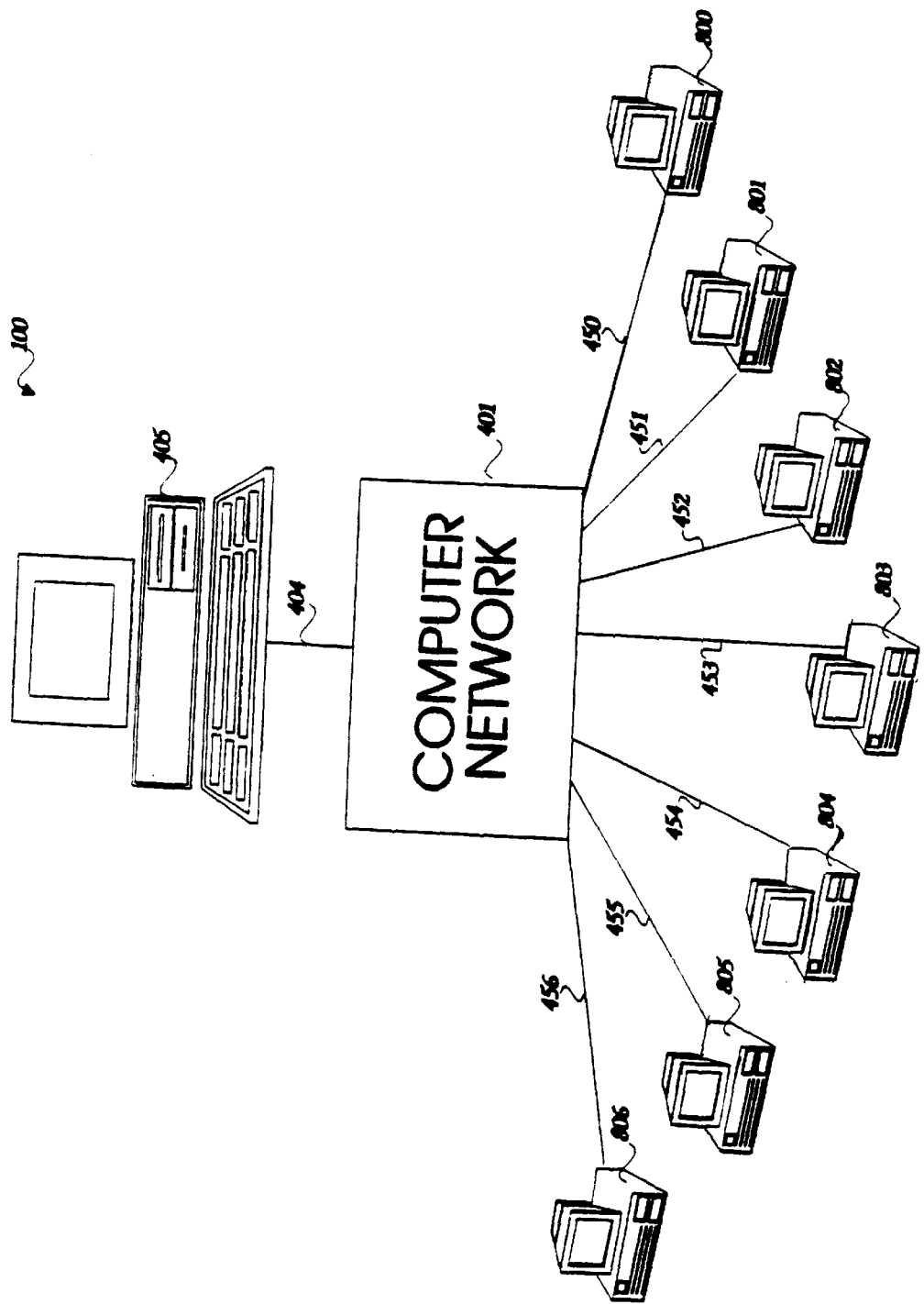

FIG. 1 illustrates an exemplary graphical user interface of the present invention showing various user options 1A-B, 2, 2A, 3, 4, 5 and 6 including a go to into user option 2A, an episodes user option 3, a calculator user option 4, a conference room user option 5, and a glossary user option 6. A user accesses various screens by designating a selected user option with a key board (not shown) or other cursor positioning device (not shown) using a terminal (FIGS. 33–34).

Figure 2:
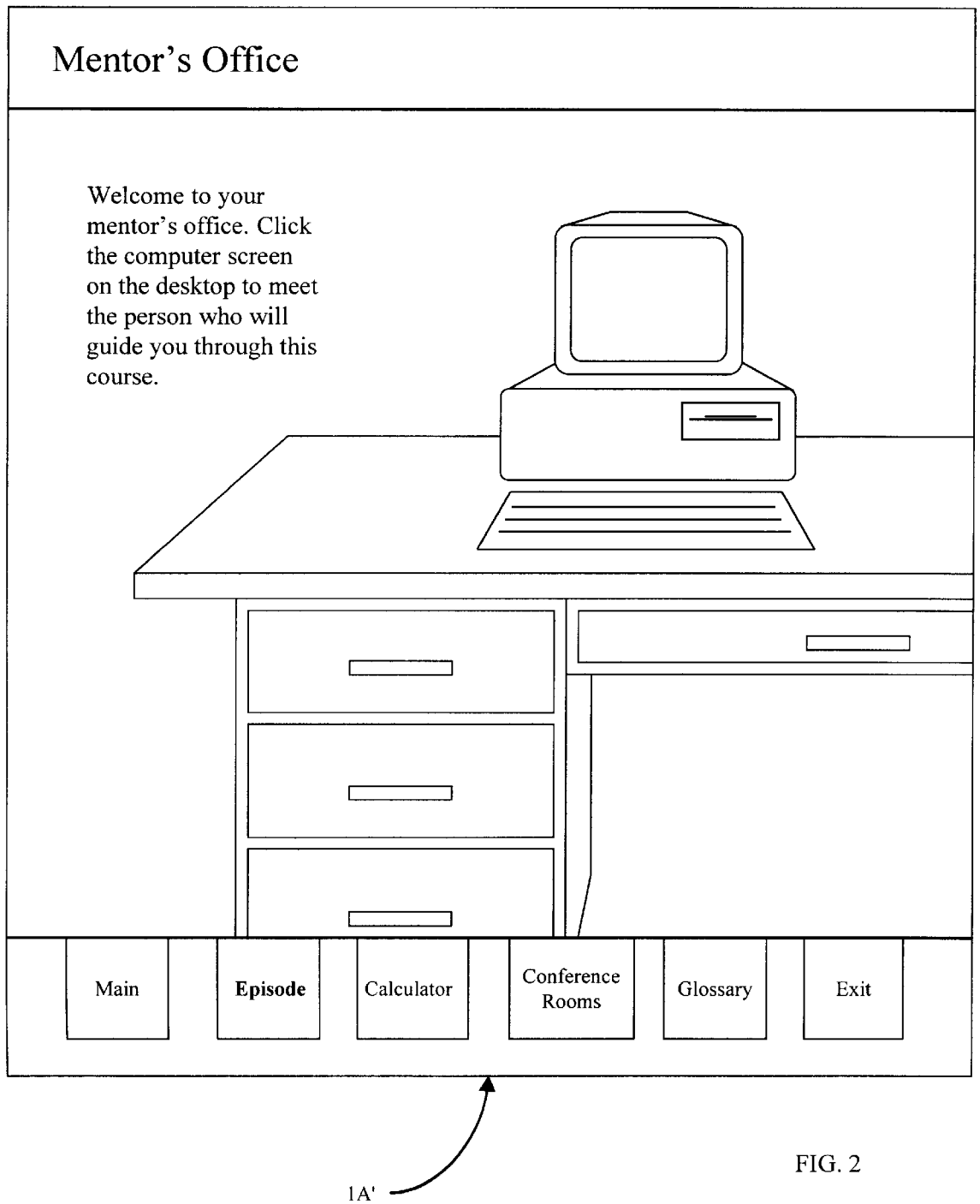
FIG. 2 illustrates a mentor introduction screen selected by designating user option two of FIG. 1.
Figure 3:
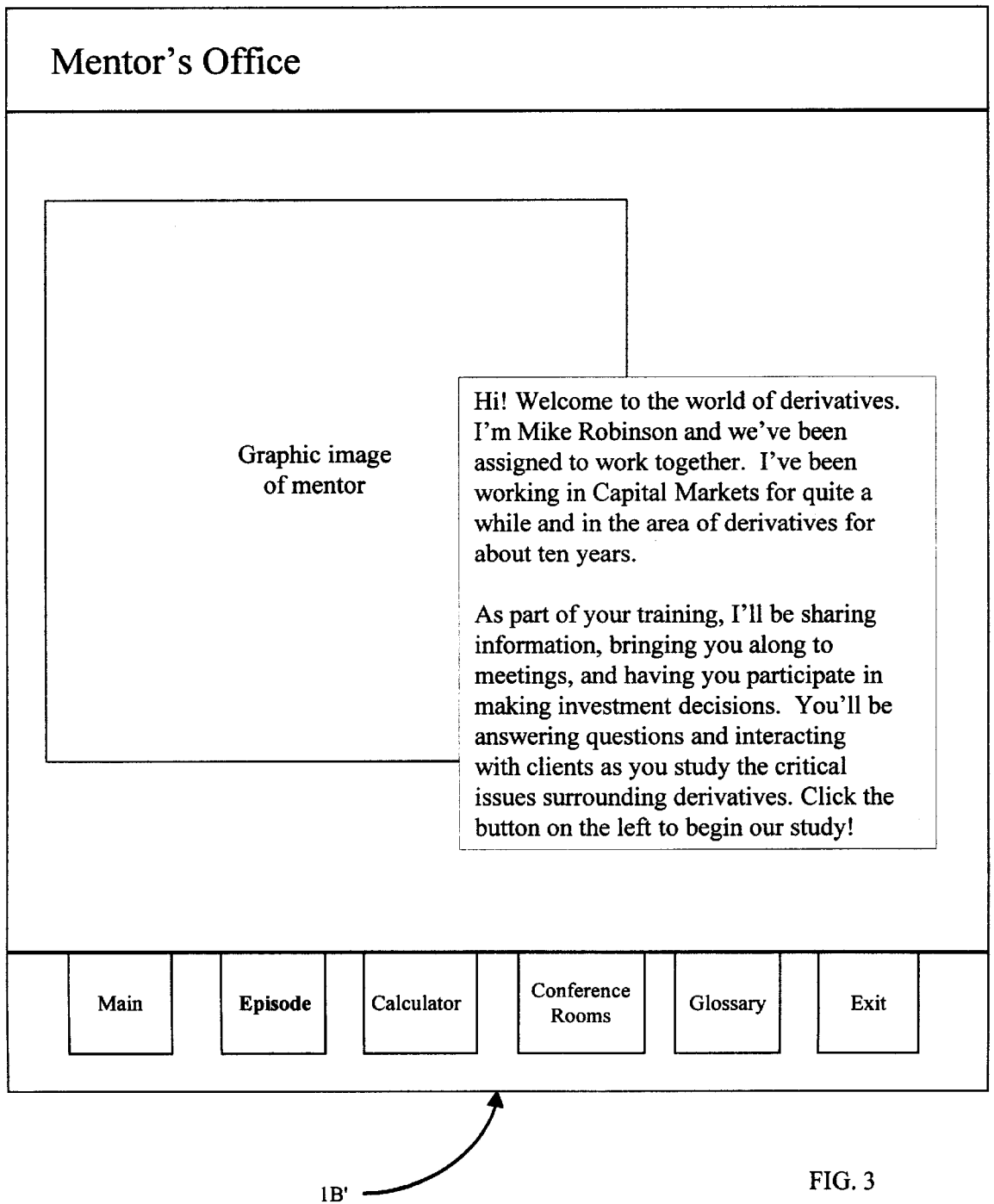
FIG. 3 illustrates a supplemental mentor introduction screen that optionally follows the screen of FIG. 2.

FIG. 2 illustrates a mentor introduction screen 1A' selected by designating user option 1A-B of FIG. 1. Mentor screen 1A' welcomes the user to the mentor's office and provides other user options, and then a supplemental mentor introduction screen 1B' is presented to the user after an optional time out period.

Figure 4:
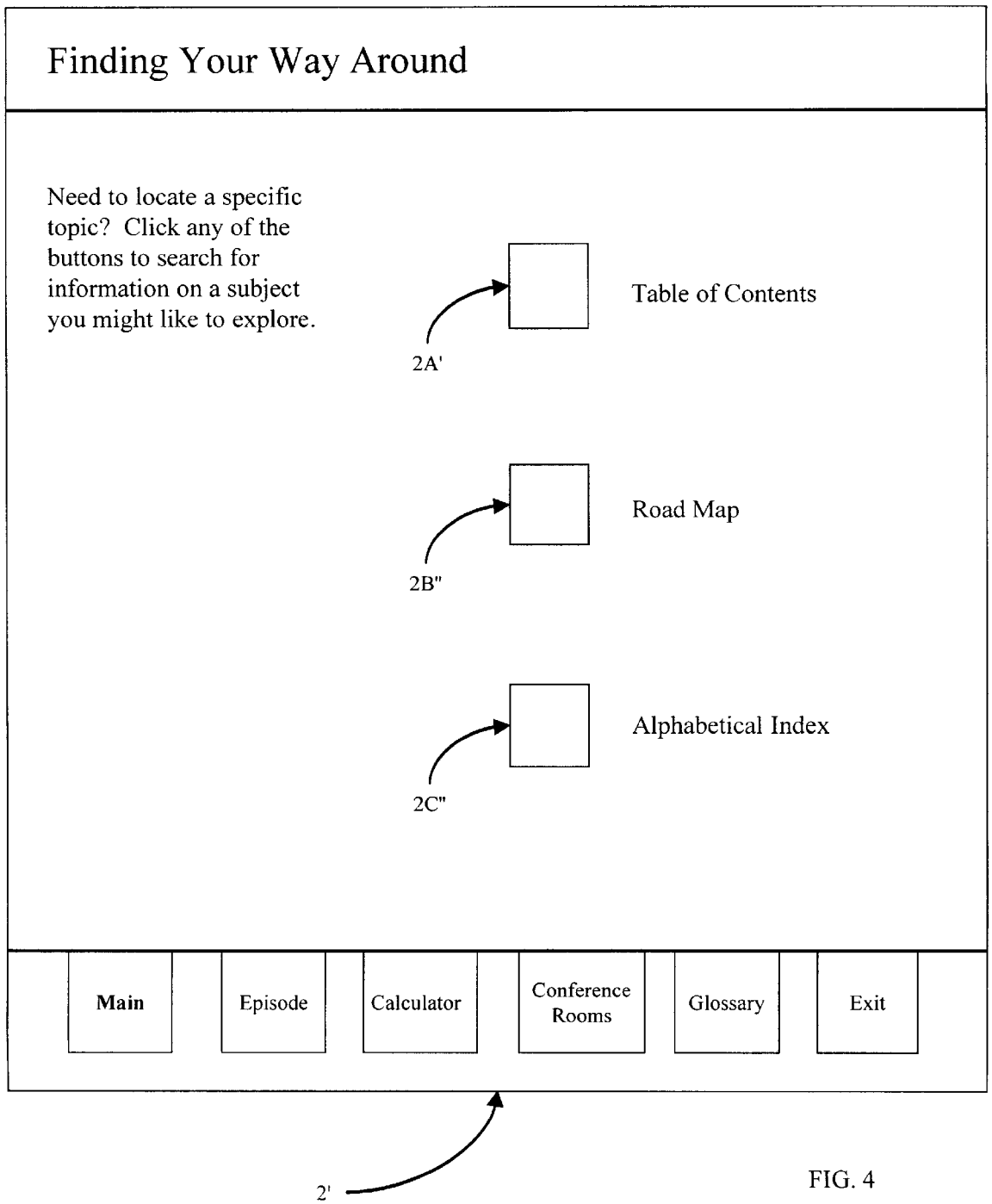
FIG. 4 illustrates a user guidance screen having a table of contents user option, a road map option, and an alphabetical index option.
Figure 5:
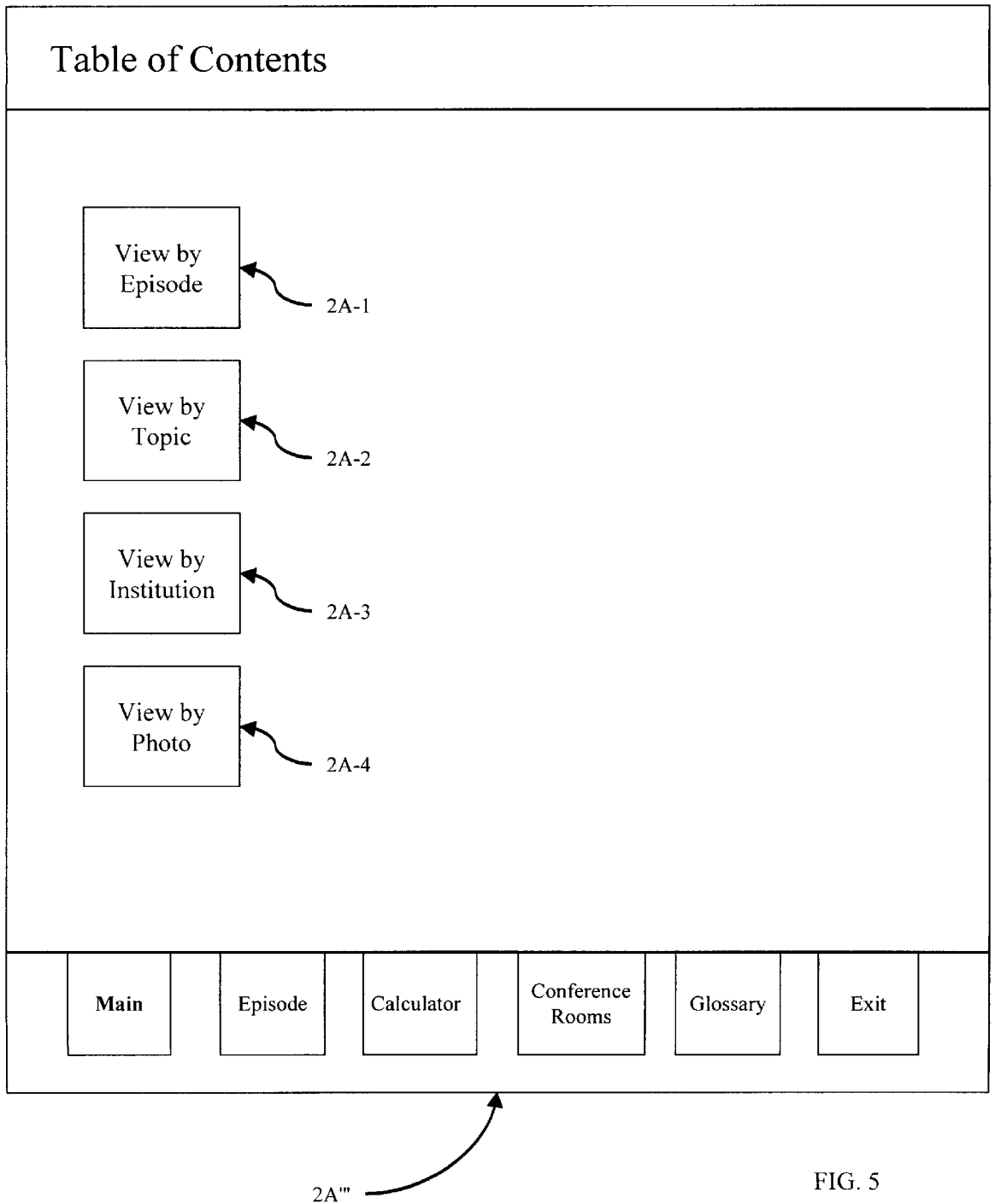
FIG. 5 illustrates a table of contents screen accessed through the table of contents user option of FIG. 4 and also having a view by episode user option, a view by topic user option, a view by institution user option, and a view by photo user option.
Figure 6:
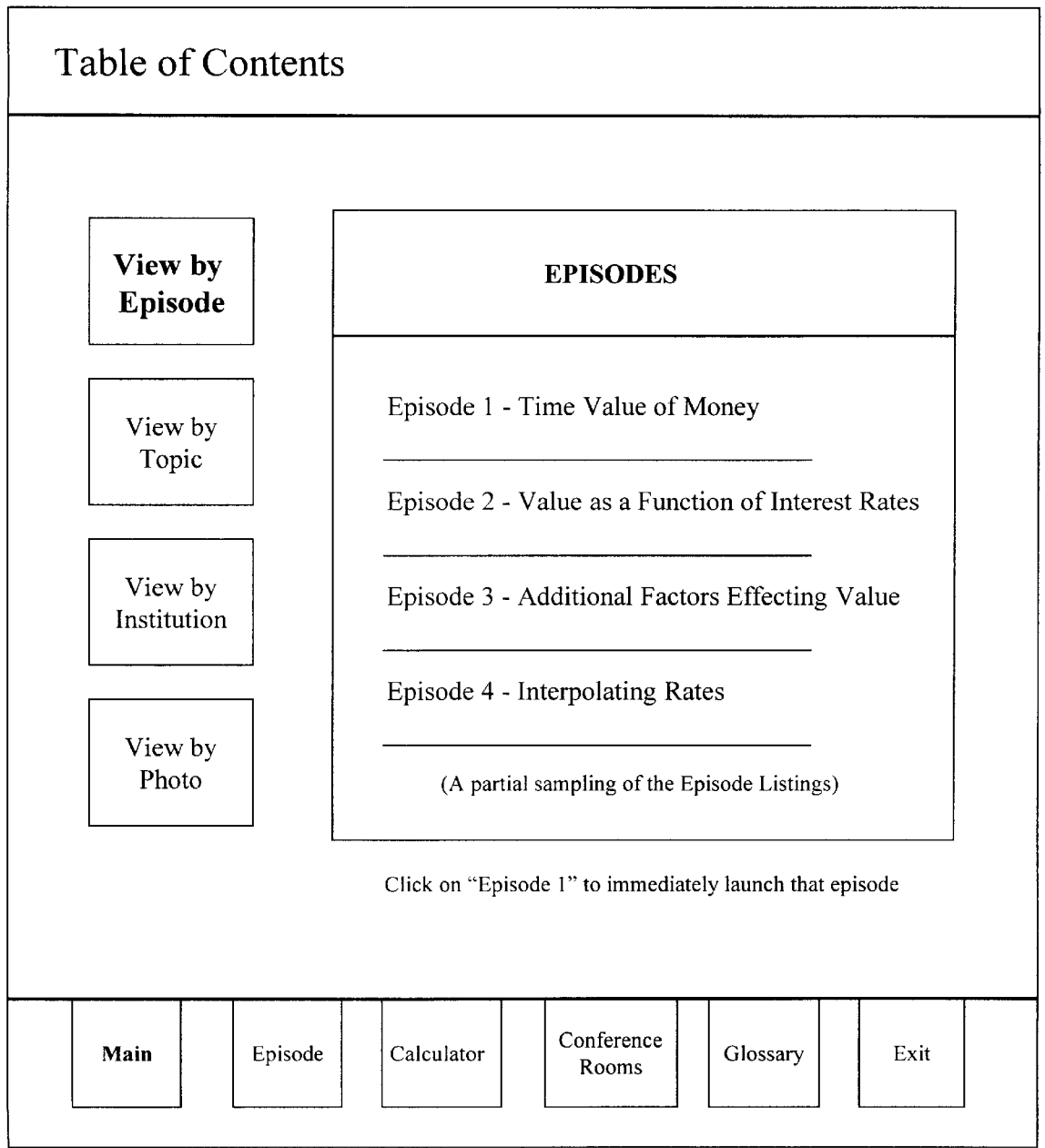
FIG. 6 illustrates a screen accessed by designating the view by episode user option of FIG. 5.

Actuation of user option 2 presents the user guidance screen 2' of FIG. 4 having a table of contents user option 2A", a road map option 2B", and an alphabetical index option 2C". FIG. 5 illustrates a table of contents screen 2A'" accessed through the table of contents user option 2A" of FIG. 4. Screen 2A'" has a view by episode user option 2A-1, a view by topic user option 2A-2, a view by institution user option 2A-3, and a view by photo user option 2A-4. FIG. 6 illustrates screen 2A-1' accessed by designating the view by episode user option 2A-1 of FIG. 5. FIG. 7 illustrates screen 2A-2' accessed by designating the view by topic user option 2A-2 of FIG. 5. FIG. 8 illustrates screen 2A-3' accessed by designating the view by institution user option 2A-3 of FIG. 5.

Figure 9:
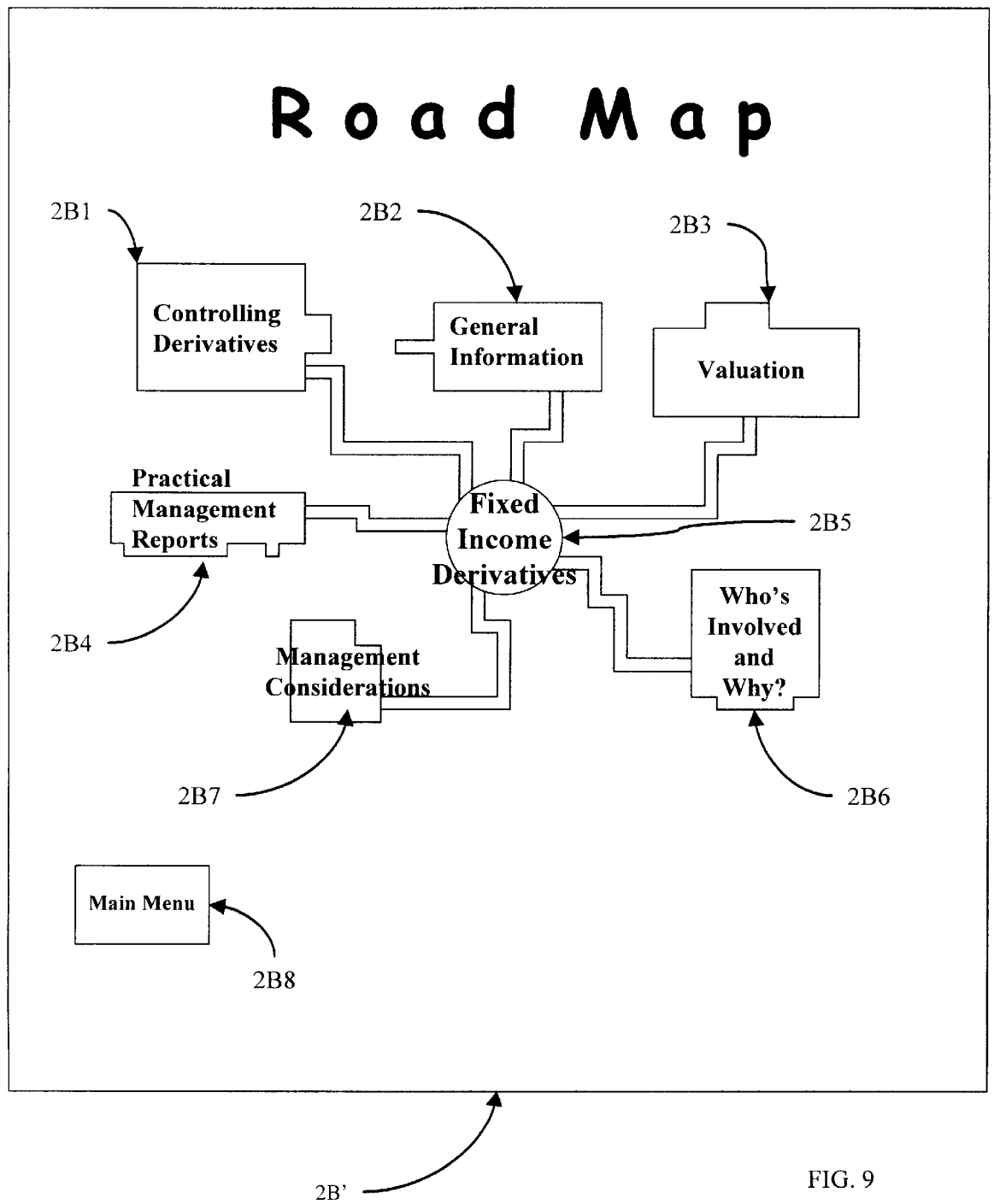
FIG. 9 illustrates a road map screen accessed by designating the road map user option of FIG. 4 having a controlling derivatives user option, a general knowledge user option, a valuation user option, a management report user option, a fixed income derivatives user option, a who's involved and why user option, a management consideration user option, and a main menu user option.

FIG. 9 illustrates a road map screen 2B' accessed by designating the road map user option of FIG. 4. Road map screen 2B' presents a controlling derivatives user option 2B1, a general knowledge user option 2B2, a valuation user option 2B3, a management report user option 2B4, a fixed income derivatives user option 2B5, a who's involved and why user option 2B6, a management consideration user option 2B7, and a main menu user option 2B8 to the user.

Figure 11:
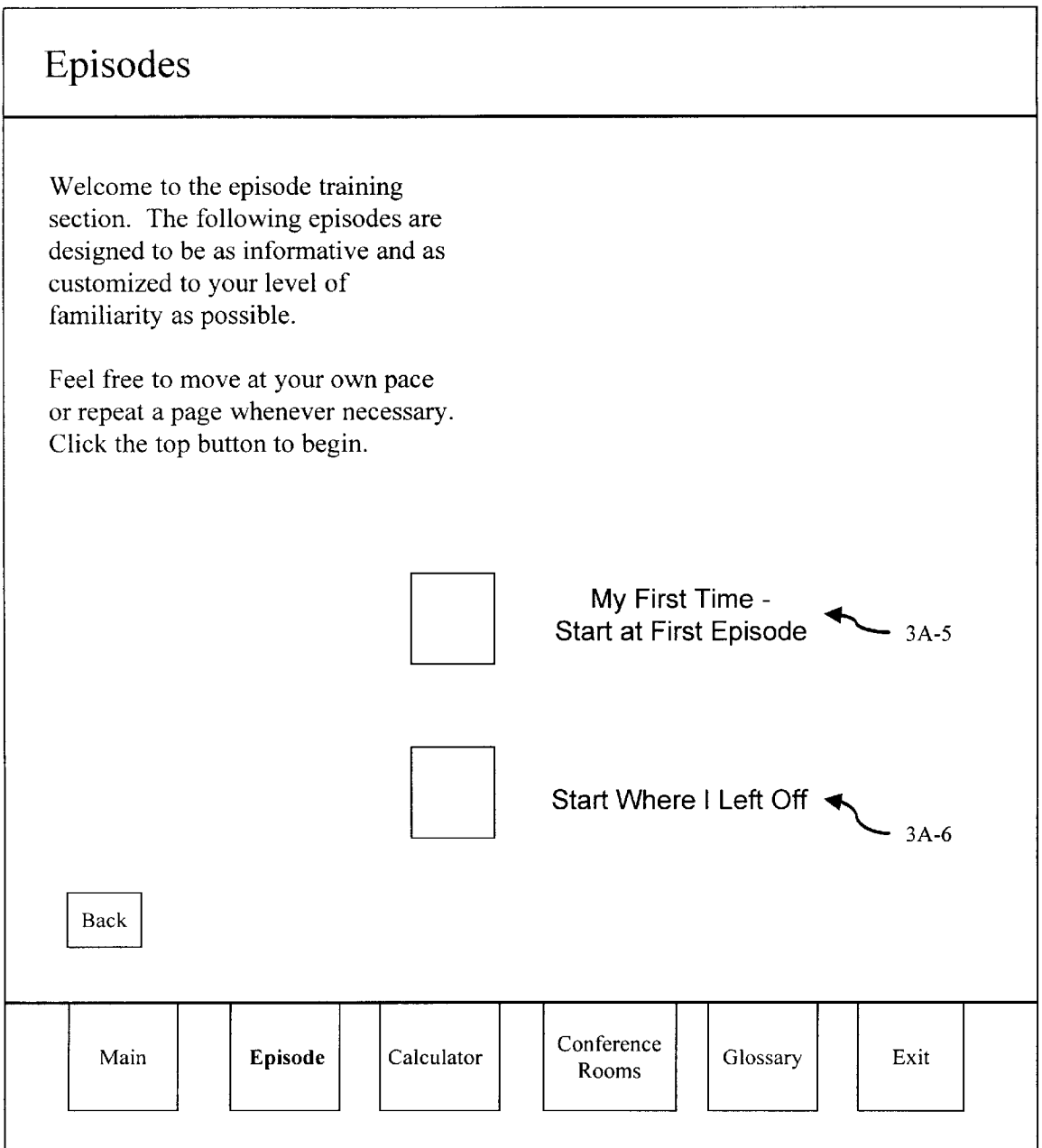
FIG. 11 illustrates an episodes screen accessed by designating the episodes user option of FIG. 1 and having a my first time-start at episode user option and a start where I left off user option.
Figure 12:
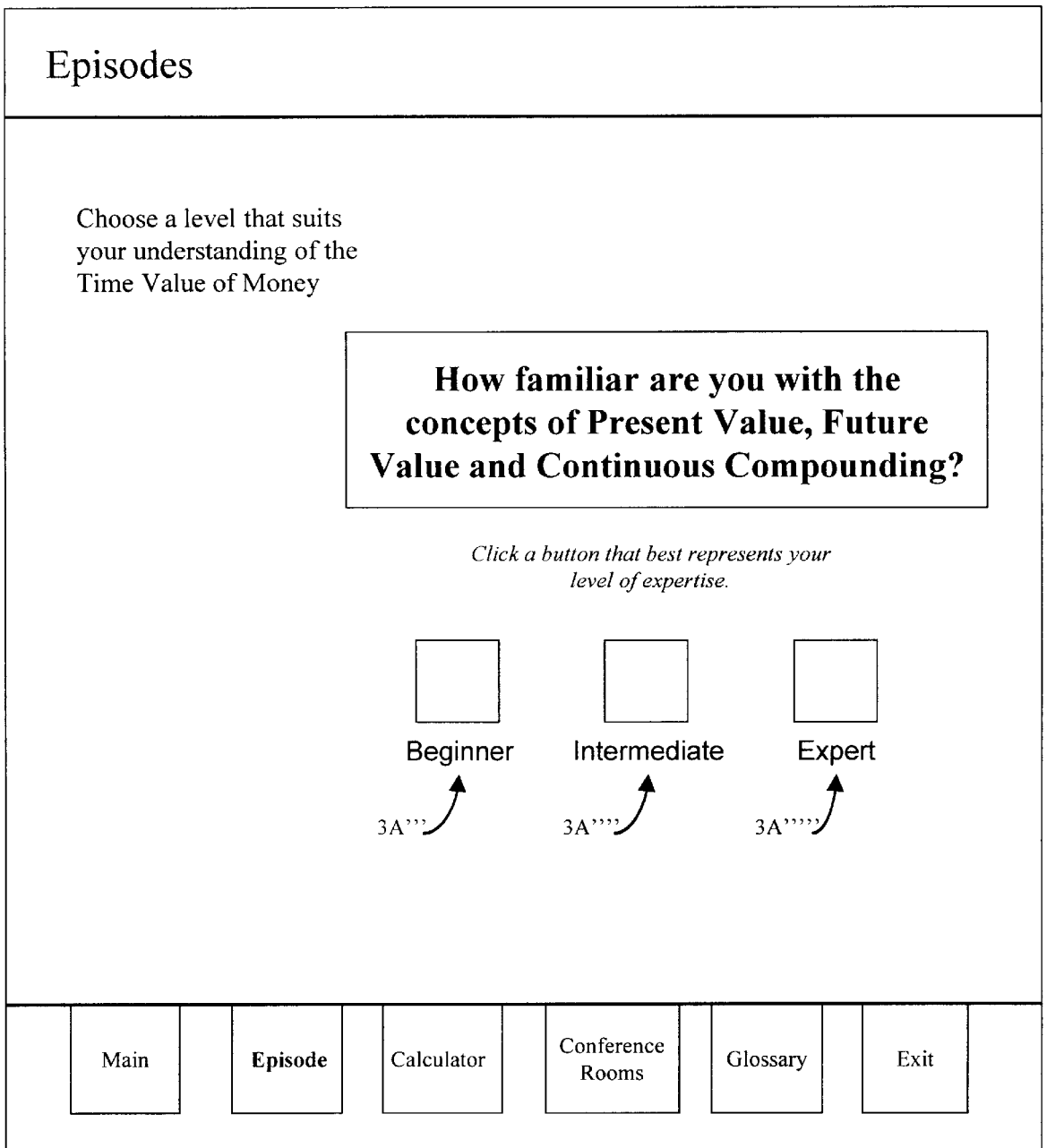
FIG. 12 illustrates a supplemental episodes screen accessed by designating the episodes user option of FIG. 1 showing different mentor levels and having a beginner user option, an intermediate user option, and an expert user option.
Figure 13:
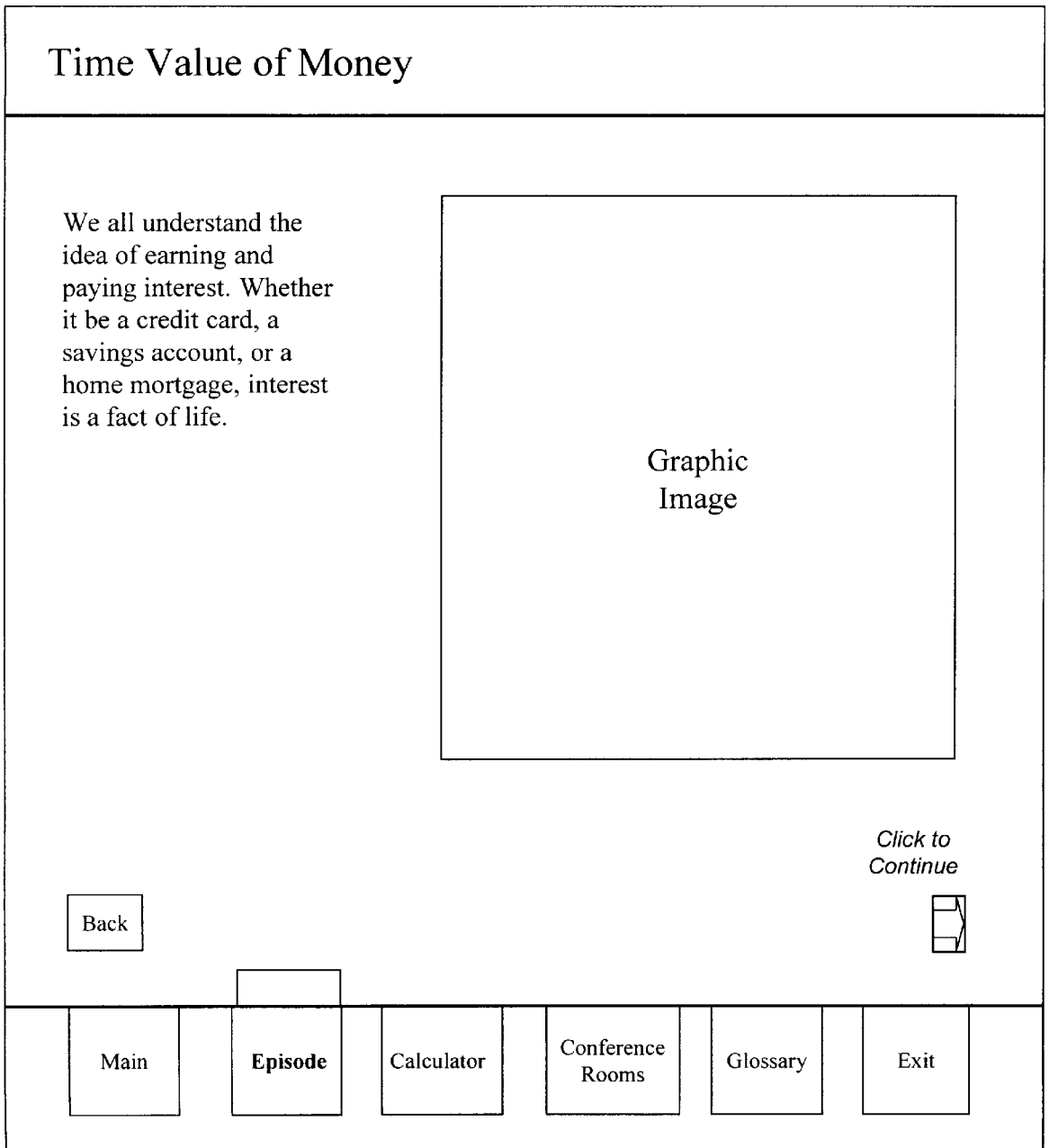
Figure 16:
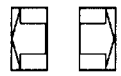

Controlling derivatives screen 2B-1' of FIG. 10 is accessed by designating the controlling derivatives user option 2B1 of FIG. 9. FIG. 11 illustrates episodes screen 3' accessed by designating the episodes user option 3 of FIG. 1. Screen 3' also includes my first time-start at episode user option 3A-5 and a start where I left off user option 3A-6. Supplemental episodes screen 3A" is then presented. Screen 3A" also provides different mentor levels and has a beginner user option 3A'", an intermediate user option 3A"", and an expert user option 3A""' as shown in FIG. 12.

Figure 22:
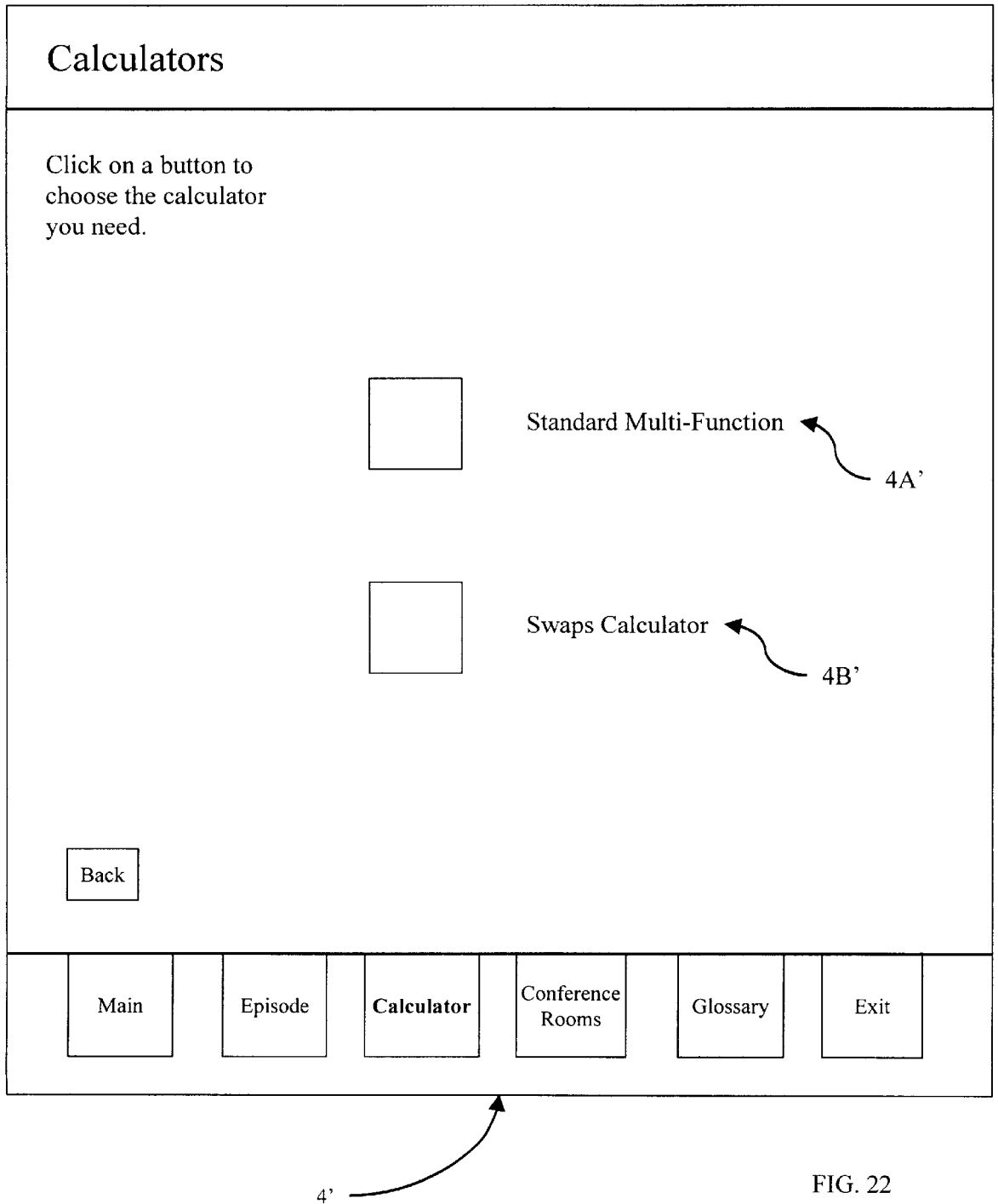
FIG. 22 illustrates a calculator screen accessed by designating the calculator user option of FIG. 1 having a standard multi-function user option and a swaps calculator option.

FIGS. 13–21 illustrate exemplary user experience level screens 3-B', 3-C', 3-D', 3-E', 3-F', 3-G', 3-H', 3-I', 3-J' on the topic of the time value of money and are related to the time value of money episode described herein. FIG. 22 illustrates calculator screen 4' accessed by designating the calculator user option 4 of FIG. 1 having a standard multi-function user option 4A' and a swaps calculator option 4B'. FIG. 23 illustrates supplemental calculator screen 4A" accessed by designating the standard multi-function user option 4A' of FIG. 22.

Figure 24:
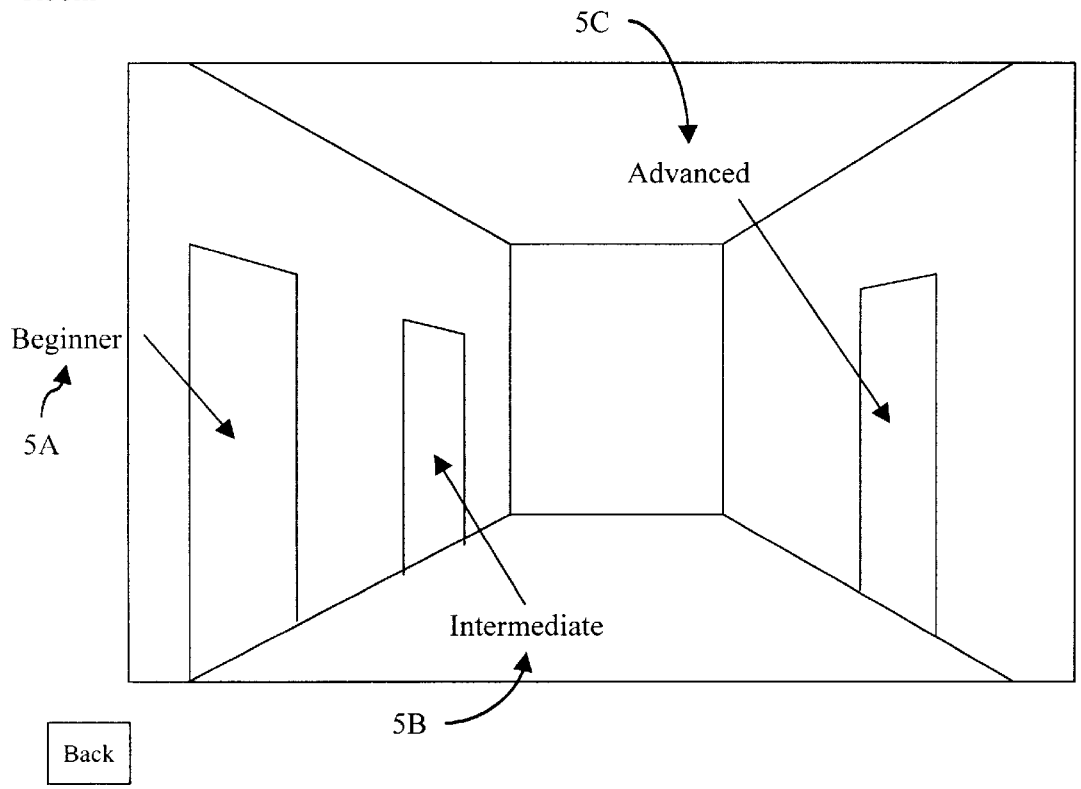
FIG. 24 illustrates a conference room screen accessed by designating the conference room option of FIG. 1 and having a conference room A option, a conference room B option, and a conference room C option accessed according to a user knowledge level.
Figure 25:
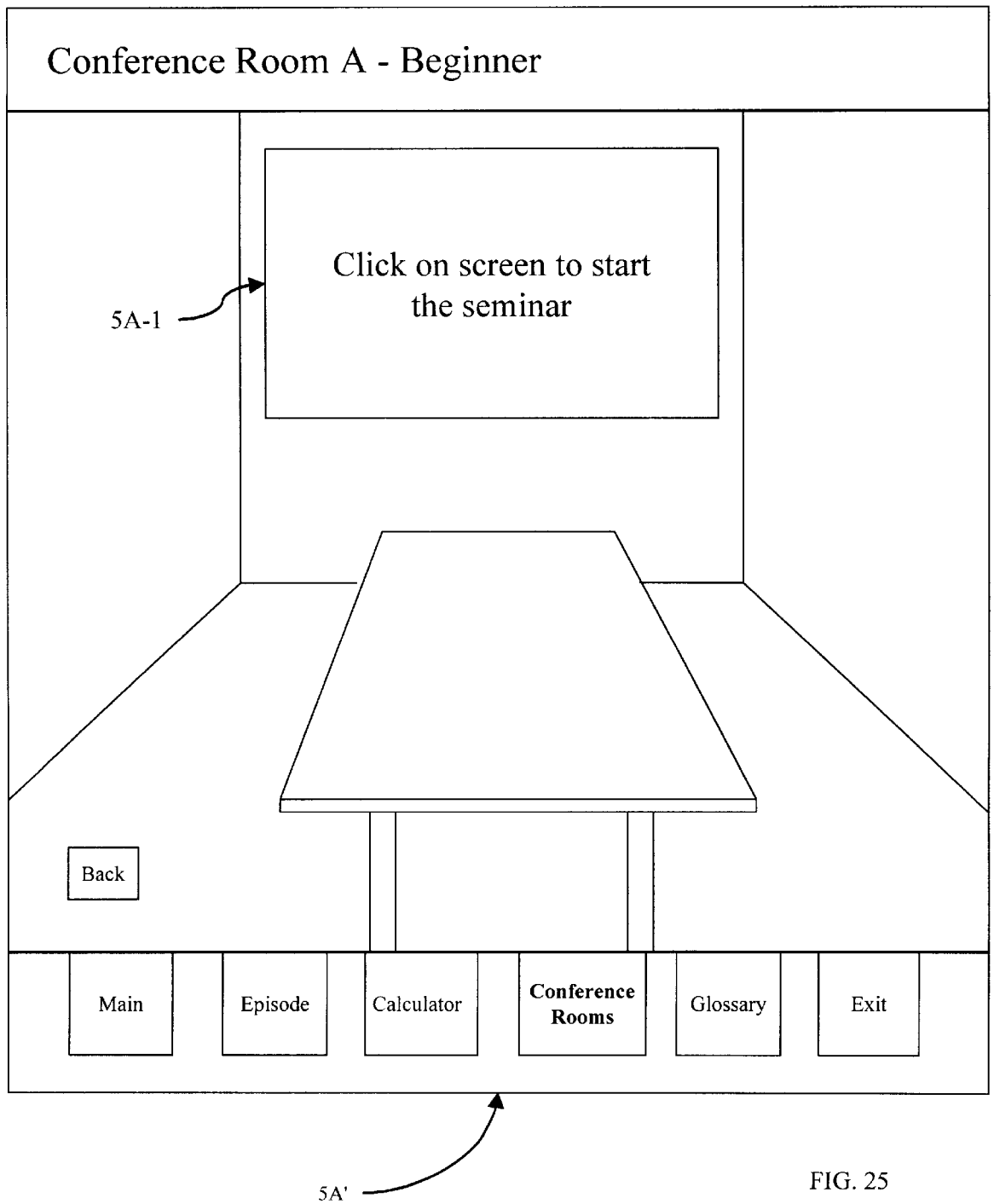
FIG. 25 illustrates conference room A screen accessed by designating the conference room A option of FIG. 24.

Conference room screen 5' is accessed by designating the conference room option 5 of FIG. 1. Conference room screen 5' has a conference room A option 5A, a conference room B option 5B, and a conference room C option 5C. These user options are accessed according to a user knowledge level. FIG. 25 illustrates conference room A screen accessed by designating the conference room A option of FIG. 24.

Figure 26:
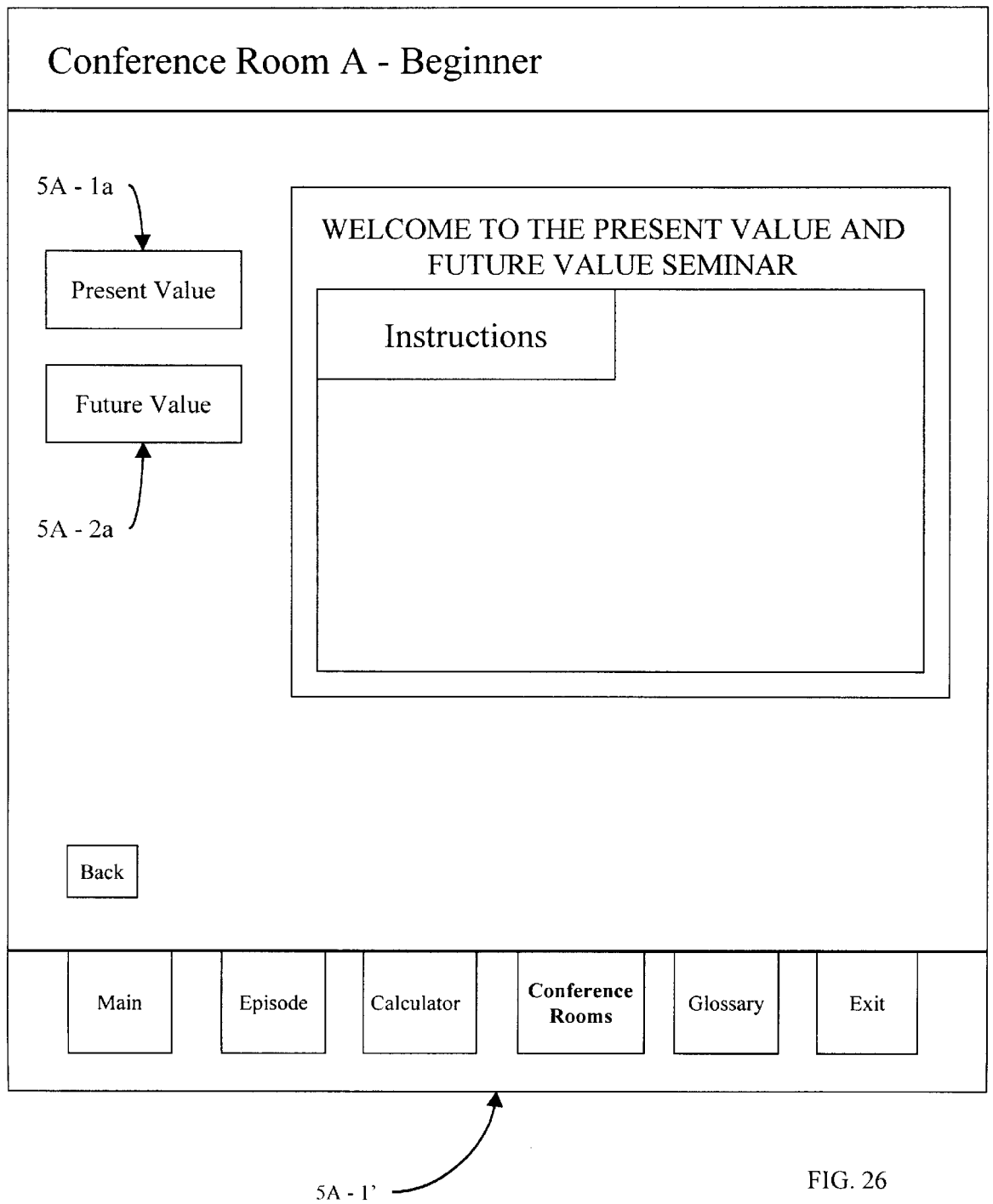
FIG. 26 illustrates a beginner wall screen option of conference room A accessed after accessing the conference room A option.
Figure 27:
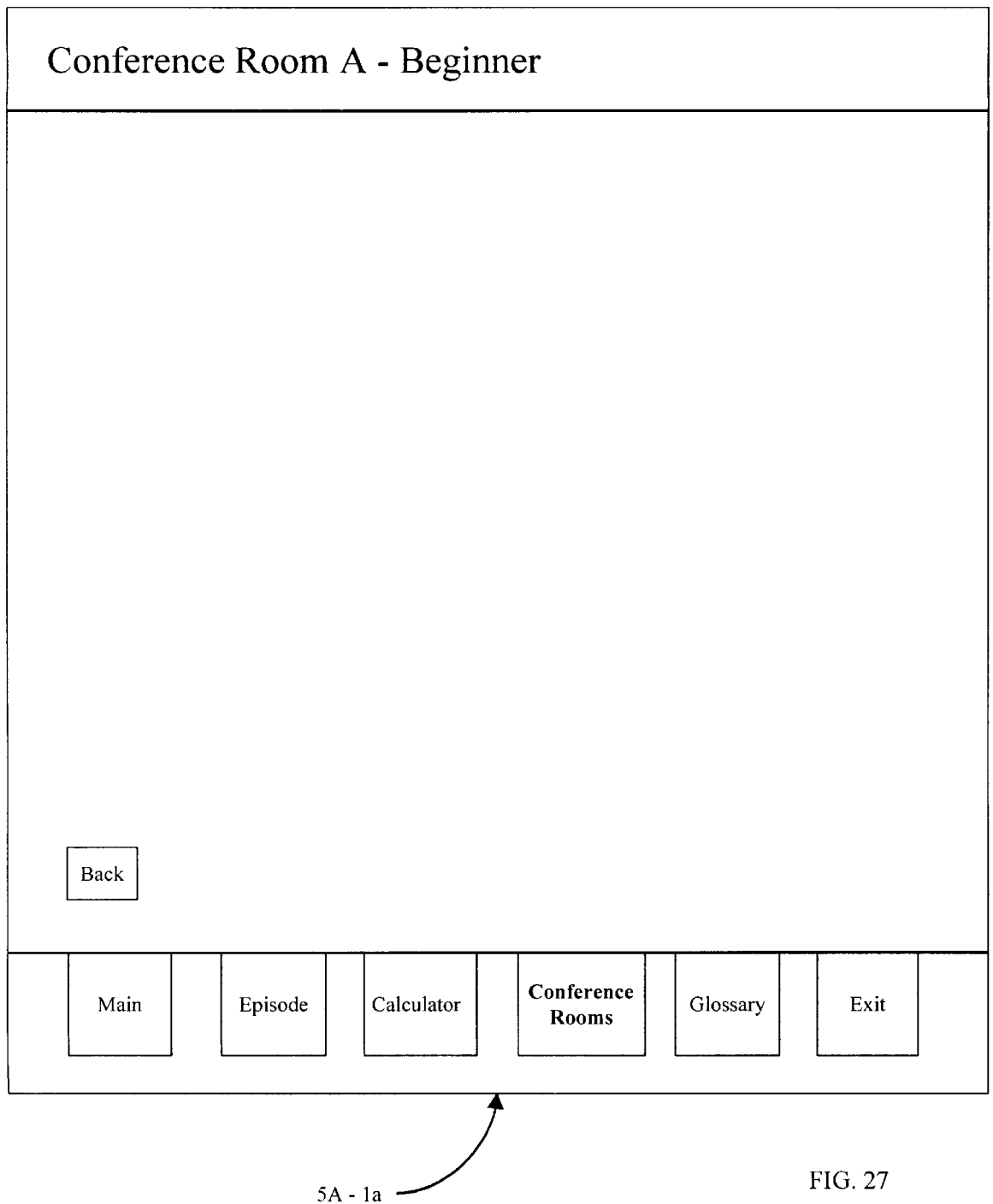
FIG. 27 illustrates a beginner wall screen accessed by designating the beginner wall screen option of FIG. 26.
Figure 29:
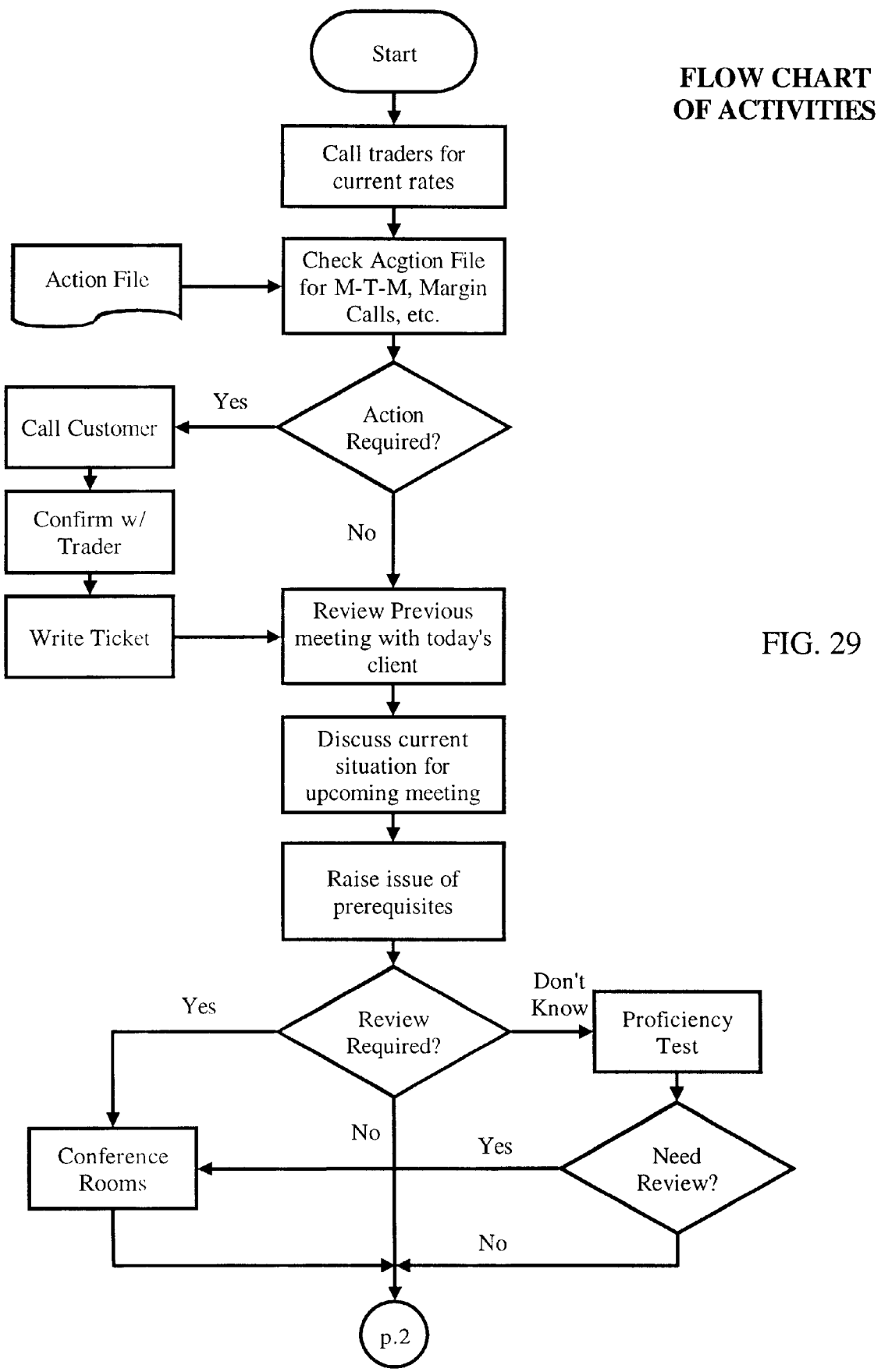
FIG. 29 illustrates a flow chart of activities of a routine of the present invention.
Figure 30:
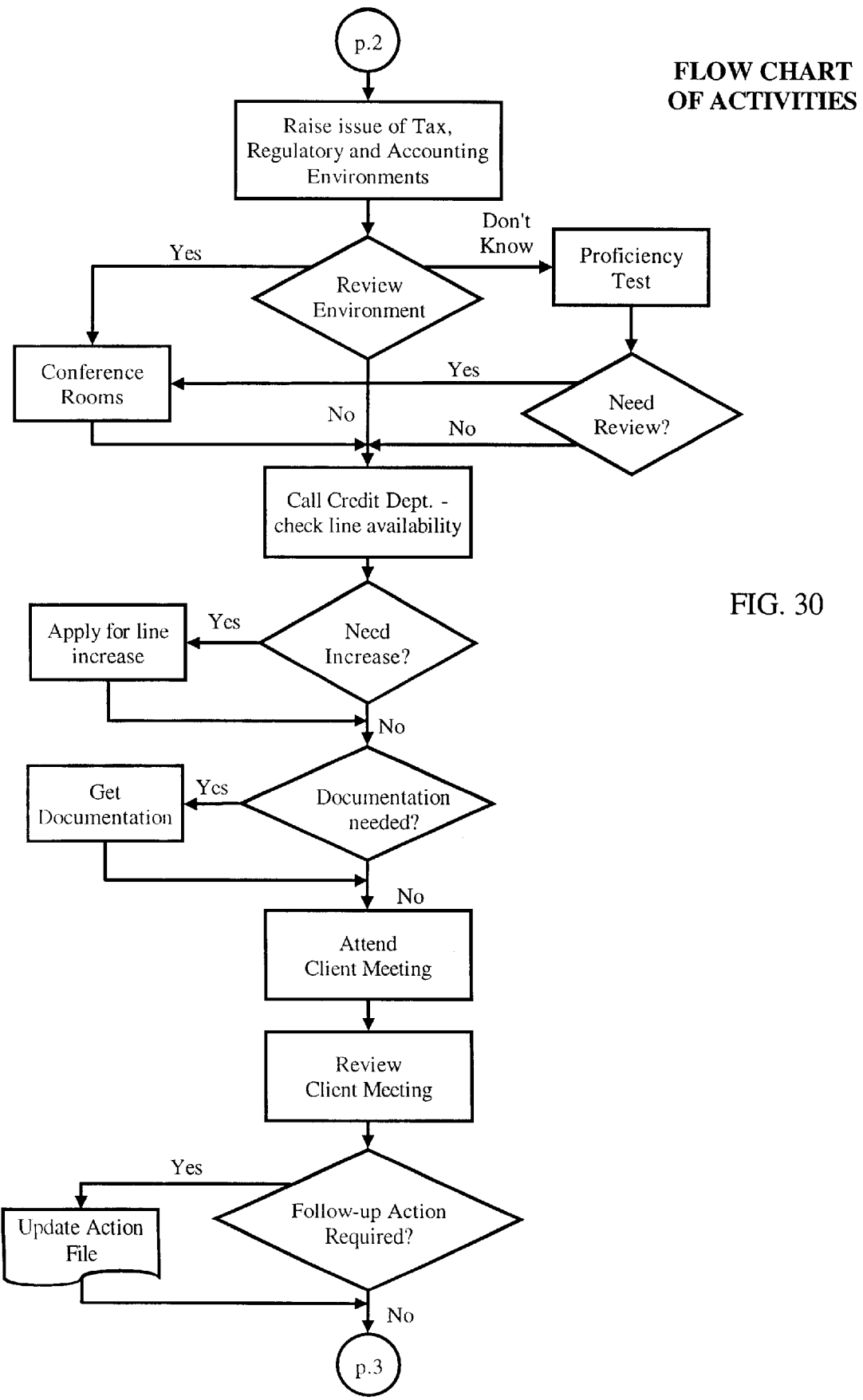
FIG. 30 illustrates a continuation of the flow chart of activities of the routine of FIG. 29.
Figure 31:
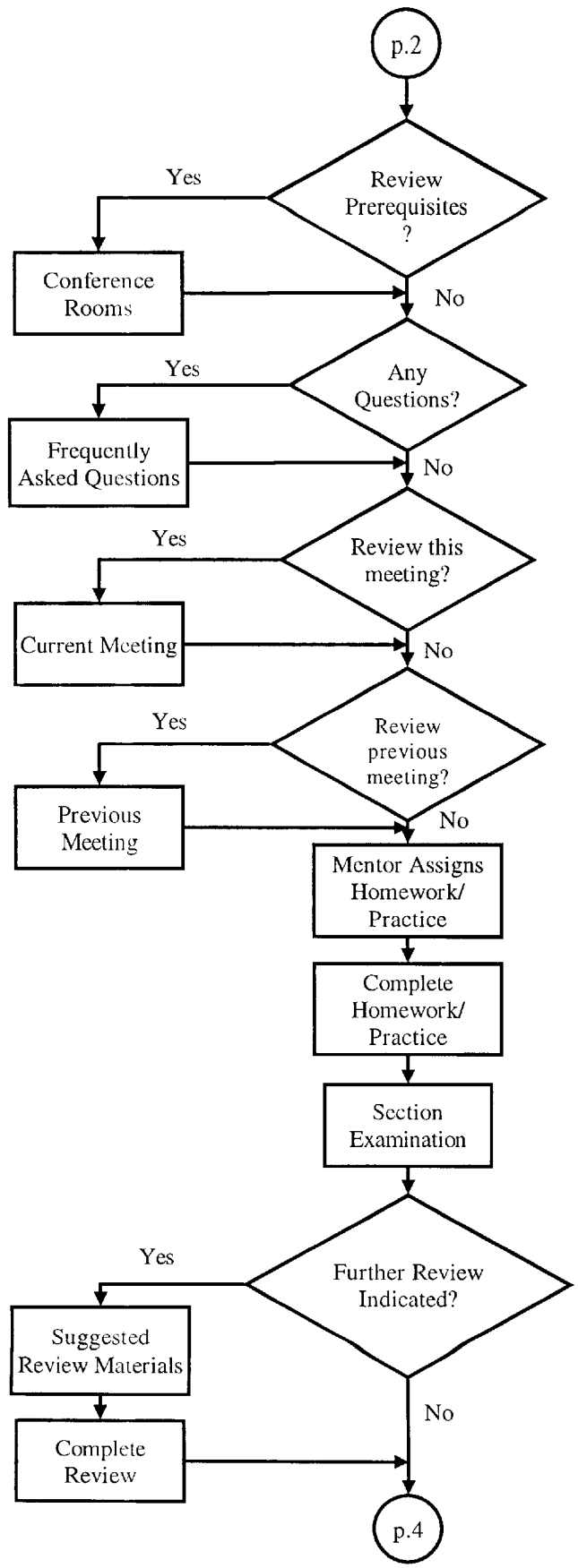
FIG. 31 illustrates a continuation of the flow chart of FIG. 30.
Figure 32:
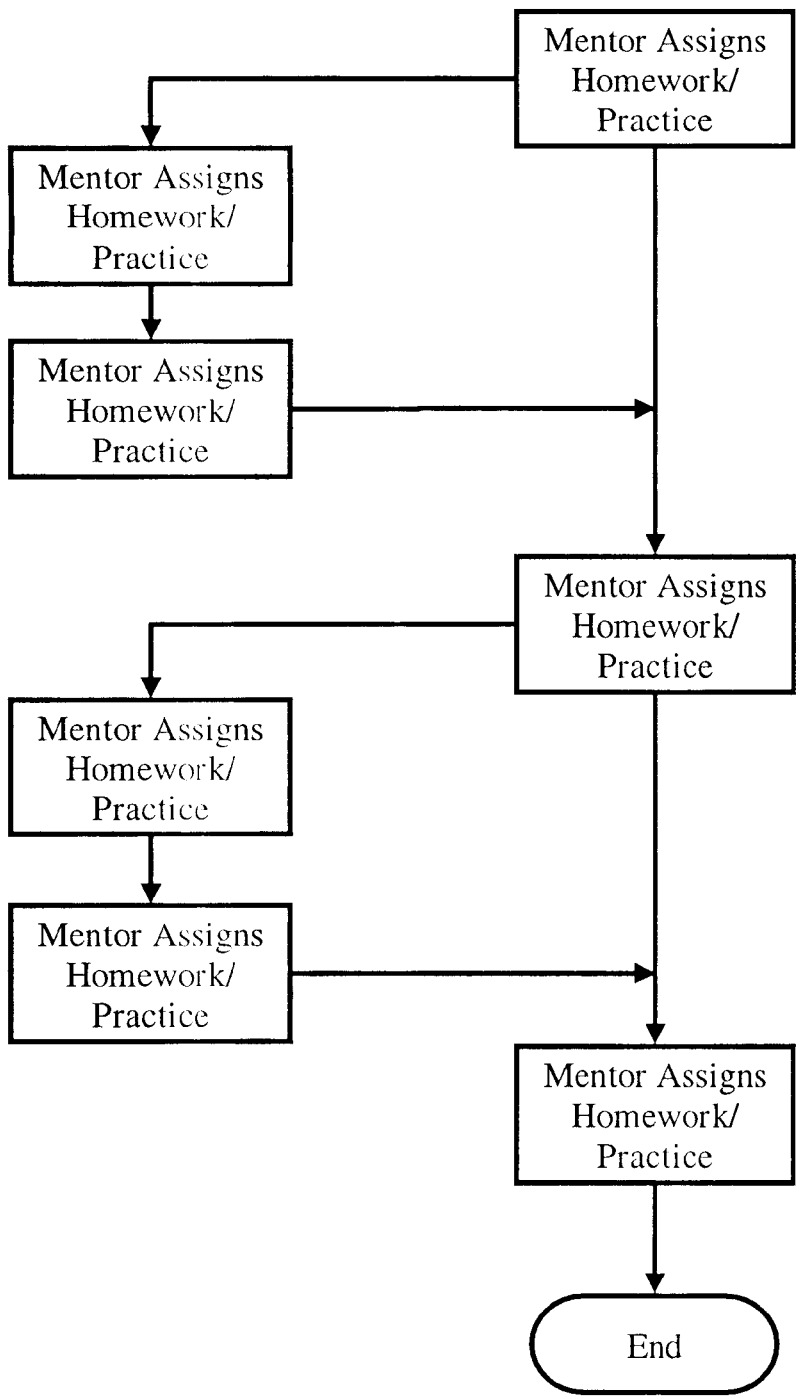
FIG. 32 illustrates a continuation of the flow chart of FIG. 31.

FIG. 26 illustrates beginner wall screen option 5A-1 of conference room A accessed after accessing the conference room A option 5A. Beginner wall screen option 5A-1 accesses screen 5A-1' having time value user option 5A-1*a* and future value user option 5A-2*a*. Designating user option 5A-1*a* of FIG. 26 presents screen 5A-1*a*' to the user. FIG. 28 illustrates glossary screen accessed 6' by designating glossary user option 6 of FIG. 1.

FIGS. 29–32 illustrate a flow chart of activities of a routine of the present invention for a linear corridor or branch accessed by designating a respective user option. It is appreciated that a plurality or multiplicity of branching corridors each having select related or unrelated conference room user options or topic areas are presented to a user as user options. Selected related branches include corridors having conference rooms that address related subject matter. One corridor branches off into two or more corridors in one variant and the branchers are assembled and categorized as per the expertise, experience level of a respective user or depth of knowledge needed by a requisite user in a given topic area.

As illustrated in FIGS. 33–34, the invention includes knowledge based user educational guidance systems 100, 1000 for accessing, storing, compiling and transferring mentor experience information directed to financial services by way of a web network of interconnected computer networks 301 or by way of intranet 401. In a variant, the web of interconnected computer networks is the internet, a graphical portion of the internet (the world wide web), or a variant thereof. An additional variant of the system contemplates delivery of the system via proprietary hardware used by third parties for gaming including the Sony Play Station® or similar products from Sega or Nintendo.

The systems 100, 1000 include servers 103, 405 communicatively linked to a plurality of data packet receiving personal computers 107, 800–803, workstations 804–806 or other terminals by way of data packet transferring communication links 208, 210, 404, 450–456. The use of other communication links is also contemplated herein. Data packet transferring servers 103, 405 provide to the personal computers 103, 800–803 or workstations 803–806 a data packet based graphical user interface for introducing and navigating throughout the knowledge based systems 100, 1000 in one variant of the invention.

By way of further example, computer network 301 is a worldwide computer network of computer networks, e.g. the Internet. Network 301 comprises local area networks, metropolitan area networks, and wide area networks. Network 301 connects computers of organizations and individuals globally in a variant. The networks that comprise networks 301, 305, 307, 309, and 401 are communicatively linked together by way of data packet transferring communication links, e.g. 404, 450–456, 311, 313, 315, 317, or other communication links. These data packet transferring communication links and others described herein comprise, by way of example, dialup phone lines, high-speed dedicated leased lines, satellites, fiber optic communication links, microwave communication links, and/or wireless satellite communication links and combinations thereof. Network 301 communicatively connects computers nationally and/or globally in another variant. The data packet receiving computers on network 301 communicate using various protocols.

Servers 405, 103 and/or personal computers 107, 800–803 or workstations 804–806 provide a set of alternative learning paths which require interactive user participation in accordance with the mentor experience information, means for the user to interactively select a desired learning path based on user interest and demonstrated performance, means for providing contextual case based explication and application of the mentor knowledge and experience directed to financial services, means for providing a set of interactive multi-tiered valid use simulations of application of said knowledge in accordance with the knowledge based system, interactive means for mentoring the user when, as, and if user learning guidance is required, and/or consequential feedback means for the user based on user responses to the mentoring.

The knowledge based user educational guidance systems 100, 1000 for accessing, storing, compiling and transferring mentor experience information directed to financial services have a data packet based graphical user interface that includes a simulated on-the-job training file, a cross-referencing or hypertext linked file linking the data packet based graphical user interface to a support area file, cross-referenced and hypertext linked to an on-the-job training episode file, a missed questions file link for automatically repeating missed question data on subsequent tests until said missed question is answered correctly, and/or a link to an additional file. The additional file includes a settlement issue file, a credit issue file, a compliance issue file, a legal documentation issue file, a legal enforceability issue file, an accounting issue file, a balance sheet consideration issue file, a tax treatment issue file, a suitability issue file, an ethical issue file, and a safety and soundness issue file. These files are all interrelated and accessed on an as needed or as designated basis utilizing various routines.

In a variant, the data packet based graphical user interface is self-leveling to the needs and abilities of the user. The self-leveling feature of the user interface is automatically self-leveling to the level of expertise of the user based upon response of the user entered on systems 100, 1000. Other features of the system 100, 1000 include real time feedback on user performance, and a communication link to a world wide web based chat room.

The invention also includes a knowledge based user educational guidance kit for accessing, storing, compiling and transferring mentor experience information directed to financial services (not shown). The kit includes a plurality of routines that are directed to training users. Users include financial services practitioners, financial service senior managers, accountants, controllers, regulators and financial service students. The assembly, categorization, flow and designation of sequential routines provide for consistent understanding of financial services issues horizontally throughout an organization.

In a variant the knowledge based user educational guidance kit through assembly, categorization, flow and designation of routines provides consistent understanding of financial services vertically throughout an organization. Vertical understanding of financial services includes substantial congruence in understanding among and between management users, front office users, and back office users utilizing the method and system described herein. In yet a further variant, the method and system provide substantially simultaneous vertical and horizontal presentation and understanding of financial service issues.

The graphical user interface and routines of the invention provide a multi-dimensional, integrated, all-in-one environment that includes simulated on-the-job training (OJT). The simulated OJT is expert mentor-led, contextual, and realistic. As such, a user assimilates knowledge in a learn-by-doing environment. In this virtual learn-by-doing environment, a set of routines provide consequences for data input answers given and decisions made by the user.

The multi-dimensional environment is multi-faceted and deals with related or ancillary issues presented in files to the user in response to data inputs and the selection of user options in an appropriate, contextual manner. The routines accessed by selection of designated user options provide a virtual role-model for the appropriate use of knowledge that is being acquired, and designated. User options are cross-referenced and hypertext-linked with support area files (including World Wide Web (WWW) based chat room support).

The system also provides expository presentation of pre-requisite and support information in data files, includes a communication link to a data packet transferred on-line support, and "when, as, and if" information and support. Based upon user data input and user option designation the routines automatically access screens and supplemental user options that tailor the user's particular expertise with the data screens and cross-reference and hypertext link with appropriate OJT episodes presented. In this regard, the routines are self-leveling to the needs and abilities of the user.

The systems 100, 1000 also include practice area files that provide the opportunity to become familiar with concepts and terminology, provide the opportunity to use the knowledge gained through use of the systems 100, 1000 in order to "hard-wire" the knowledge retrieval process. Systems 100, 1000 also give real time feedback on performance of the user with an emphasis on contextual games, rather than just rote drill exercises.

The systems 100, 1000 also including testing files that provide results analysis, and suggest areas for further study. In one variant, a missed questions file is provided where missed questions are repeated on subsequent tests until they are answered correctly. The graphical user interface of systems 100, 1000 is truly multi-media and includes sound files, video files, graphics files, in black and white or color. The various files are designated and accessed in a non-linear manner using sophisticated, intuitive navigation tools, and contextual mapping of subject and content. As such, systems 100, 1000 are fun, engaging, accessible, and seductive.

Exemplary breadths of coverage of the routines and files described herein include: files and routines that deal with an issue directly at hand, i.e. how interest rate swaps work, risk measurement, pricing; files and routines that deal with support issues, i.e. settlement, credit, compliance; files that deal with legal issues, i.e. documentation, and enforceability; files and routines that deals with accounting issues, i.e. balance sheet considerations and tax treatment; and, files and routines that deals with ethical issues, i.e. suitability and safety and soundness. The present invention also contemplates that other financial services related issues are included in appropriate screens, files, user options, and routines.

The screens, user options, files and routines herein embody a multiple-target audience approach. Separate, but related and cross linked, screens, user options, files and routines are provided for different areas of learner needs. These learners include practitioners, senior managers, accountants, controllers and regulators, and students. Each respective learner need has an appropriate user option, screen and file associated or correlated therewith. The categorization, cross linking, and access of various items allows for consistent understanding of issues vertically throughout an organization by management user, the front office user, and the back office user.

In another variant, the invention includes a data packet transferring network and a computer readable medium including the user method for accessing the mentor experience information described above. The computer readable medium includes at least one of a floppy disk, a magnetic tape, a CD-ROM, a play station cartridge and a hard drive.

It is further appreciated that various method steps described herein can be added or deleted without departing from the spirit and scope of the invention.

While only a few, preferred embodiments of the invention have been described hereinabove, those of ordinary skill in the art will recognize that the embodiment may be modified and altered without departing from the central spirit and scope of the invention. Thus, the preferred embodiment described hereinabove is to be considered in all respects as illustrative and not restrictive, the scope of the invention being indicated by claims appended hereto, rather than by the foregoing description, and all changes which come within the meaning and range of equivalency of the claims are intended to be embraced herein.

I claim:

1. In a knowledge based user educational guidance system accessing, storing, compiling and transferring mentor experience information directed to financial services, a user method for accessing said mentor experience information comprising:

(i) providing a graphical user interface for introducing and navigating throughout said knowledge based system;

(ii) providing a set of alternative learning paths which require interactive user participation in accordance with said mentor experience information;

(iii) providing means for the user to interactively select a desired learning path based on user interest and demonstrated performance;

(iv) providing contextual case based explication and application of said mentor knowledge and experience directed to financial services;

(v) providing a set of interactive multi-tiered valid use simulations of application of said knowledge in accordance with said knowledge based system;

(vi) providing interactive means for mentoring said user when, as, and if user learning guidance is required; and (vii) providing consequential feedback for the user based on user responses to said mentoring, in which said steps (ii), (iv), (v), (vi), or (vii) are accessed in a non-linear manner independent of whether or not said user has successfully completed a required task.

2. A knowledge based user educational guidance system for accessing, storing, compiling and transferring mentor experience information directed to financial services comprising:

a server communicatively linked to a plurality of personal computers or workstations; said server providing to said personal computers or workstations a graphical user interface for introducing and navigating throughout said knowledge based system; said system providing a set of non-linear alternative learning paths which require interactive user participation in accordance with said mentor experience information; means for the user to non-linearly and interactively select a desired learning path based on user interest and demonstrated performance; means for providing contextual case based explication and application of said mentor knowledge and experience directed to financial services; means for providing a set of interactive multi-tiered valid use simulations of application of said knowledge in accordance with said knowledge based system; interactive means for mentoring said user when, as, and if user learning guidance is required; and consequential feedback means for the user based on user responses to said mentoring.

3. The knowledge based user educational guidance system for accessing, storing, compiling and transferring mentor experience information directed to financial services of claim 2 in which said server is communicatively linked to a plurality of terminals via a web of interconnected networks.

4. The knowledge based user educational guidance system for accessing, storing, compiling and transferring mentor experience information directed to financial services of claim 3 in which said web of interconnected networks comprises a wide area network.

5. The knowledge based user educational guidance system for accessing, storing, compiling and transferring mentor experience information directed to financial services of claim 2 in which said system further comprises simulated means for on the job training.

6. The knowledge based user educational guidance system for accessing, storing, compiling and transferring mentor experience information directed to financial services of claim 2 in which said system is self-leveling to the needs and abilities of said user.

7. The knowledge based user educational guidance system for accessing, storing, compiling and transferring mentor experience information directed to financial services of claim 2 in which said system is cross-referenced and hypertext linked to an on-the-job training episode file.

8. The knowledge based user educational guidance system for accessing, storing, compiling and transferring mentor experience information directed to financial services of claim 2 in which said system further comprises means for real time feedback based on user performance.

9. The knowledge based user educational guidance system for accessing, storing, compiling and transferring mentor experience information directed to financial services of claim 2 in which said system further comprises at least one of a settlement issue file, a credit issue file, a compliance issue file, a legal documentation issue file, a legal enforceability issue file, an accounting issue file, a balance sheet consideration issue file, a tax treatment issue file, a suitability issue file, an ethical issue file, and a safety and soundness issue file.

10. The system of claim 2 in which said means for the user to interactively select a desired learning path comprises a computer keyboard or cursor positioning device and said means for storing said mentor experience information comprises a memory.

11. The system of claim 2 further comprising means for providing a case based explication and means for providing a set of simulations comprising a plurality of instructions.

12. The method of claim 1 further comprising the step of providing worldwide web chat room support.

13. A knowledge based user educational guidance system for accessing, storing, compiling and transferring mentor experience information directed to financial services comprising:

an Internet linked server communicatively linked to a plurality of remote personal computers or workstations; said server providing to said personal computers or workstations a graphical user interface for introducing and navigating throughout said knowledge based system; said system providing a set of non-linear alternative learning paths which require interactive user participation in accordance with said mentor experience information; means for the user to non-linearly and interactively select a desired learning path based on user interest and demonstrated performance; means for providing contextual case based explication and application of said mentor knowledge and experience directed to financial services; means for providing a set of interactive multi-tiered valid use simulations of application of said knowledge in accordance with said knowledge based system; interactive means for mentoring said user when, as, and if user learning guidance is required; and consequential feedback means for the user based on user responses to said mentoring.

* * * * *